(12) United States Patent
Yang et al.

(10) Patent No.: US 9,942,742 B2
(45) Date of Patent: Apr. 10, 2018

(54) SIGNAL TRANSMISSION FOR PROXIMITY-BASED SERVICES WIRELESS COMMUNICATIONS

(71) Applicant: NOKIA SOLUTIONS AND NETWORKS OY, Espoo (FI)

(72) Inventors: Weidong Yang, Hoffman Estates, IL (US); Juha Sakari Korhonen, Espoo (FI); Esa Tapani Tiirola, Kempele (FI); Cassio Barboza Ribeiro, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 7 days.

(21) Appl. No.: 14/864,390

(22) Filed: Sep. 24, 2015

(65) Prior Publication Data

US 2016/0095099 A1 Mar. 31, 2016

Related U.S. Application Data

(60) Provisional application No. 62/056,458, filed on Sep. 26, 2014, provisional application No. 62/056,528, filed on Sep. 27, 2014.

(51) Int. Cl.
*H04W 8/00* (2009.01)
*H04L 5/00* (2006.01)
*H04W 48/16* (2009.01)

(52) U.S. Cl.
CPC ............. *H04W 8/005* (2013.01); *H04L 5/00* (2013.01); *H04W 48/16* (2013.01)

(58) Field of Classification Search
CPC .. H04J 4/00; H04J 2011/00; H04J 2011/0009; H04J 2011/0013; H04J 2011/0016
See application file for complete search history.

(56) References Cited

U.S. PATENT DOCUMENTS 9,485,798 B2 * 11/2016 Fujishiro .............. H04W 8/005
2015/0326998 A1 * 11/2015 Wanstedt ............. H04W 4/008
370/329

(Continued)

OTHER PUBLICATIONS

Qualcomm Incorporated "Resource allocation for Type 1 D2D discovery"; R1-142958; 3GPP TSG-RAN WG1 #78, Aug. 18-22, 2014; Dresden, Germany; 8 pages; 3rd Generation Partnership Project (3GPP); Mobile Competence Centre; 650, Route des Lucioles; F-06921 Sophia-Antipolis Cedex; France.

(Continued)

*Primary Examiner* — Alvin Zhu
(74) *Attorney, Agent, or Firm* — Brake Hughes Bellermann LLP

(57) ABSTRACT

A technique may include transmitting, by a user device in a proximity-based services wireless network via a first time-frequency resource identified by a first logical time index within N logical time resources and a first logical frequency index in the range from 0 to M−1, a first occurrence of a signal for the user device during a transmission period; determining a time index adjustment associated with the first logical frequency index; determining, by the user device, a second logical time index of a second time-frequency resource for transmitting from the user device a second occurrence of the signal within the transmission period, the second logical time index being determined based on the first logical time index and the time index adjustment associated with the first logical frequency index; and transmitting, by the user device via the second time-frequency resource, a second occurrence of the signal during the transmission period.

15 Claims, 14 Drawing Sheets

(56) References Cited

U.S. PATENT DOCUMENTS

2016/0234762 A1* 8/2016 You ...................... H04J 11/0056
2016/0345297 A1* 11/2016 Chen .................... H04W 72/02
2016/0360393 A1* 12/2016 Wu ...................... H04W 8/005

OTHER PUBLICATIONS

LG Electronics "Discussion on resource allocation for Type 2B discovery"; R1-143183; 3GPP TSG RAN WG1 Meeting #78; Dresden, Germany, Aug. 18-22, 2014; 7 pages; 3rd Generation Partnership Project (3GPP); Mobile Competence Centre; 650, Route des Lucioles; F-06921 Sophia-Antipolis Cedex; France.

Alcatel-Lucent Shanghai Bell et al "Discovery Resource selection for Type 1 resource allocation"; R1-143020; 3GPP TSG RAN WG1 Meeting #78; Dresden, Germany, Aug. 18-22, 2014; 5 pages; 3rd Generation Partnership Project (3GPP); Mobile Competence Centre; 650, Route des Lucioles; F-06921 Sophia-Antipolis Cedex; France.

Nokia Networks et al "Pattern design and resource allocation signaling for discovery Type 2B"; R1-143251; 3GPP TSG RAN WG1 Meeting #78; Dresden, Germany, Aug. 18-22, 2014; 12 pages; 3rd Generation Partnership Project (3GPP); Mobile Competence Centre; 650, Route des Lucioles; F-06921 Sophia-Antipolis Cedex; France.

"RAN1 Chairman's Notes" 3GPP TSG RAN WG1 Meeting #78, Dresden, Germany, Aug. 18-22, 2014, 49 pages.

3GPP TR 36.843 V12.0.1 (Mar. 2014), 3rd Generation Partnership Project; Technical Specification Group Radio Access Network; Study on LTE Device to Device Proximity Services; Radio Aspects (Release 12), 50 pages.

Nokia Networks et al., "WF on SA resource definition and transmit pattern design", R1-143656, 3GPP TSG RAN WG1 #78, Dresden, Germany, Aug. 18-22, 2014, 6 pages.

3GPP TS 23.303 V12.0.0 (Feb. 2014), 3rd Generation Partnership Project; Technical Specification Group Services and System Aspects; Proximity-based services (ProSe); Stage 2 (Release 12), 53 pages.

Nokia Networks et al., "Scheduling Assignment design for D2D communications" R1-144166, 3GPP TSG-RAN WG1 Meeting #79, Ljubljana, Slovenia, Oct. 6-10, 2014, 5 pages.

Nokia Networks et al., "Discovery signal repetition", R1-144169, 3GPP TSG-RAN WG1 Meeting #78bis, Ljubljana, Slovenia, Oct. 6-10, 2014, 7 pages.

Nokia Networks et al., "Scheduling Assignment design for D2D communications", R1-144337, 3GPP TSG-RAN WG1 Meeting #79, Ljubljana, Slovenia, Oct. 6-10, 2014, 10 pages.

Nokia Networks et al., "Scheduling Assignment design for D2D communications" R1-144396, 3GPP TSG-RAN WG1 Meeting #79, Ljubljana, Slovenia, Oct. 6-10, 2014, 14 pages.

* cited by examiner

FIG. 13

| Subframe 1 | Subframe 2 | Subframe 3 | Subframe 4 | Subframe 5 | Subframe 6 | Subframe 7 | Subframe 8 | Subframe 9 | Subframe 10 | Subframe 11 | Subframe 12 |
|---|---|---|---|---|---|---|---|---|---|---|---|
| 1 | 2 | 3 | 4 | 5 | 6 | 7 | 8 | 9 | 10 | 11 | 12 |
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | | | | | | | | |

| Subframe 1 | Subframe 2 | Subframe 3 | Subframe 4 | Subframe 5 | Subframe 6 | Subframe 7 | Subframe 8 | Subframe 9 | Subframe 10 | Subframe 11 | Subframe 12 |
|---|---|---|---|---|---|---|---|---|---|---|---|
| 56 | 57 | 58 | 59 | 60 | | 61 | 62 | 63 | 64 | 54 | 55 |
| 45 | 46 | 47 | 48 | 37 | 49 | 50 | 51 | 52 | 53 | 43 | 44 |
| 34 | 35 | 36 | 25 | 26 | 38 | 39 | 40 | 41 | 42 | 32 | 33 |
| 23 | 24 | 13 | 14 | 15 | 27 | 28 | 29 | 30 | 31 | 21 | 22 |
| 12 | 1 | 2 | 3 | 4 | 16 | 17 | 18 | 19 | 20 | 10 | 11 |
| | | | | | 5 | 6 | 7 | 8 | 9 | | |

→ FR Frequency

SIGNAL TRANSMISSION FOR PROXIMITY-BASED SERVICES WIRELESS COMMUNICATIONS

PRIORITY CLAIM

This application claims priority to U.S. provisional application No. 62/056,458, filed on 26 Sep. 2014, entitled "Discovery Signal Transmission For Proximity-Based Services Wireless Communications", and U.S. provisional application No. 62/056,528, filed on 27 Sep. 2014, entitled "Transmission Pattern Design to solve the half duplex problem", both of which are incorporated by reference herein.

TECHNICAL FIELD

This description relates to wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipments (UE). LTE has included a number of improvements or developments.

SUMMARY

According to an example implementation, a method may include transmitting, by a user device in a proximity-based services wireless network via a first time-frequency resource, a first occurrence of a first discovery signal for the user device during a first discovery period, determining, by the user device, a second time-frequency resource based on the first time-frequency resource and a first rule, transmitting, by the user device via the second time-frequency resource, a second occurrence of the first discovery signal during the first discovery period, determining, by the user device, a third time-frequency resource based on the first time-frequency resource and a second rule, the second rule being different than the first rule, and transmitting, by the user device via the third time-frequency resource, a first occurrence of a second discovery signal for the user device during a second discovery period.

According to another example implementation, a method may include transmitting, by a user device in a proximity-based services wireless network via a first time-frequency resource identified by a first logical time index and a first logical frequency index, a first occurrence of a first discovery signal for the user device during a first discovery period, determining a time index adjustment associated with the first logical frequency index, determining, by the user device, a second logical time index of a second time-frequency resource for transmitting from the user device a second occurrence of the first discovery signal within the first discovery period, the second logical time index being determined based on the first logical time index and the time index adjustment associated with the first logical frequency index, and transmitting, by the user device via the second time-frequency resource, a second occurrence of the discovery signal during the first discovery period.

According to another example implementation, a method may include transmitting, by a user device in a proximity-based services wireless network via a first time-frequency resource identified by a first logical time index and a first logical frequency index, a first occurrence of a first discovery signal for the user device during a first discovery period, determining a second logical time index of a second time-frequency resource as a cyclically shifted first logical time index, and transmitting, by the user device via the second time-frequency resource, a second occurrence of the first discovery signal during the first discovery period.

According to another example implementation, a method may include transmitting, by a user device in a proximity-based services wireless network via a first time-frequency resource identified by a first logical time index within N logical time resources and a first logical frequency index in the range from 0 to M−1, a first occurrence of a signal for the user device during a transmission period; determining a time index adjustment associated with the first logical frequency index; determining, by the user device, a second logical time index of a second time-frequency resource for transmitting from the user device a second occurrence of the signal within the transmission period, the second logical time index being determined based on the first logical time index and the time index adjustment associated with the first logical frequency index; and transmitting, by the user device via the second time-frequency resource, a second occurrence of the signal during the transmission period.

According to another example implementation, an apparatus includes at least one processor and at least one memory including computer instructions, when executed by the at least one processor, cause the apparatus to: transmit, by a user device in a proximity-based services wireless network via a first time-frequency resource identified by a first logical time index within N logical time resources and a first logical frequency index in the range from 0 to M−1, a first occurrence of a signal for the user device during a transmission period; determine a time index adjustment associated with the first logical frequency index; determine, by the user device, a second logical time index of a second time-frequency resource for transmitting from the user device a second occurrence of the signal within the transmission period, the second logical time index being determined based on the first logical time index and the time index adjustment associated with the first logical frequency index; and transmit, by the user device via the second time-frequency resource, a second occurrence of the signal during the transmission period.

According to another example implementation, a method includes transmitting, by a user device in a proximity-based services wireless network via a first time-frequency resource identified by a first logical time index and a first logical frequency index in the range from, a first occurrence of a signal for the user device during a transmission period; determining a cyclical shift amount associated with the first logical frequency index; cyclically shifting the first logical frequency index by the cyclical shift amount assigned to the first logical frequency index to obtain the second logical time index; determining a second logical frequency index of a second time-frequency resource as the first logical frequency index plus an offset of one-half a total number of logical frequency resources; and transmitting, by the user device via the second time-frequency resource and the second logical frequency resource, a second occurrence of the signal during the transmission period.

According to another example implementation, an apparatus includes at least one processor and at least one memory including computer instructions, when executed by the at least one processor, cause the apparatus to: transmit, by a user device in a proximity-based services wireless network via a first time-frequency resource identified by a first logical time index and a first logical frequency index in the range from, a first occurrence of a signal for the user device during a transmission period; determine a cyclical shift amount associated with the first logical frequency index; cyclically shift the first logical frequency index by the cyclical shift amount assigned to the first logical frequency index to obtain the second logical time index; determine a second logical frequency index of a second time-frequency resource as the first logical frequency index plus an offset of one-half a total number of logical frequency resources; and transmit, by the user device via the second time-frequency resource and the second logical frequency resource, a second occurrence of the signal during the transmission period.

The details of one or more examples of implementations are set forth in the accompanying drawings and the description below. Other features will be apparent from the description and drawings, and from the claims.

BRIEF DESCRIPTION OF THE DRAWINGS

FIG. 13 illustrates a resource design according to another example implementation.

DETAILED DESCRIPTION

Figure 1:
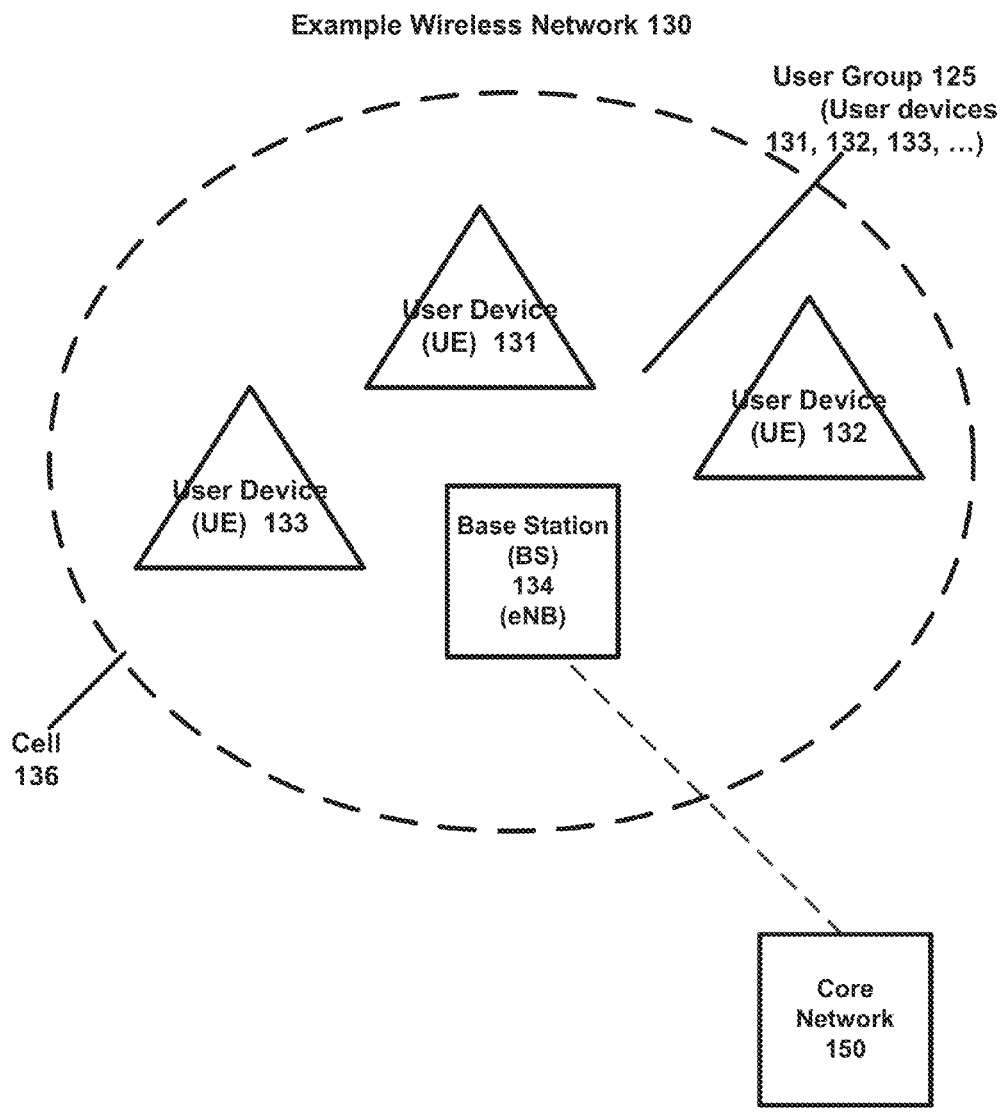
FIG. 1 is a block diagram of a wireless network according to an example implementation.

FIG. 1 is a block diagram of a wireless network 130 according to an example implementation. In the wireless network 130 of FIG. 1, user devices 131, 132 and 133, which may also be referred to as user equipments (UEs), may be connected (and in communication) with a base station (BS) 134, which may also be referred to as an enhanced Node B (eNB). At least part of the functionalities of a base station or (e)Node B may be also be carried out by any node, server or host which may be operably coupled to a transceiver, such as a remote radio head. BS 134 provides wireless coverage within a cell 136. Although only three user devices are shown within cell 136 (connected or attached to BS 134), any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE, core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

According to an example implementation, user devices 131, 132, and 133 may be in proximity to each other and may be part of a user group (or cluster) 125. According to an example implementation, the user devices of user group 125 may operate in a proximity-based services (ProSe) or device-to-device (D2D) mode in which user devices may directly communicate with each other or discover proximity of each other. Thus, in a ProSe or D2D mode, communications may occur directly between user devices, rather than passing through BS 134, for example. ProSe or D2D communications may be performed, for example, in the event of a breakage of S1 interface 151 or other network failure. Alternatively, a user group 125 may be established and the user devices 131, 132 and 133 may perform ProSe or D2D communications even when no such network failure has occurred, such as, for example, to offload traffic from the network (BS 134 and core network 150) and/or to allow user devices to communicate directly in a D2D mode.

In a ProSe or D2D wireless network, each user device may transmit a ProSe discovery signal to allow other user devices to discover the transmitting user device. According to one illustrative example, a user device may transmit a proximity-based services discovery request which may include one or more of the following: a proximity-based services application identifier; a user device identity for the user device (which may be a mobile station ID, an IMSI (International Mobile Subscriber Identity), MSISDN (Mobile Station International Subscriber Directory Number), etc.); an address for the user device (e.g., L2 address, an Internet Protocol (IP) address, or other address); and/or an application identity that identifies an application that triggered transmitting the discovery signal. Other fields may be included within a ProSe discovery signal (e.g., ProSe discovery request), as these are merely some examples.

According to an example implementation, a user device may send/transmit discovery signals via time-frequency resources (discovery resources) at least once per discovery period. In one example implementation, the network may determine which discovery resources each user device should use to transmit its ProSe discovery signals. Also, for example, a time-frequency hopping (or changing) pattern may be used to determine one or more next discovery resources to be used to transmit discovery signals.

Figure 2:
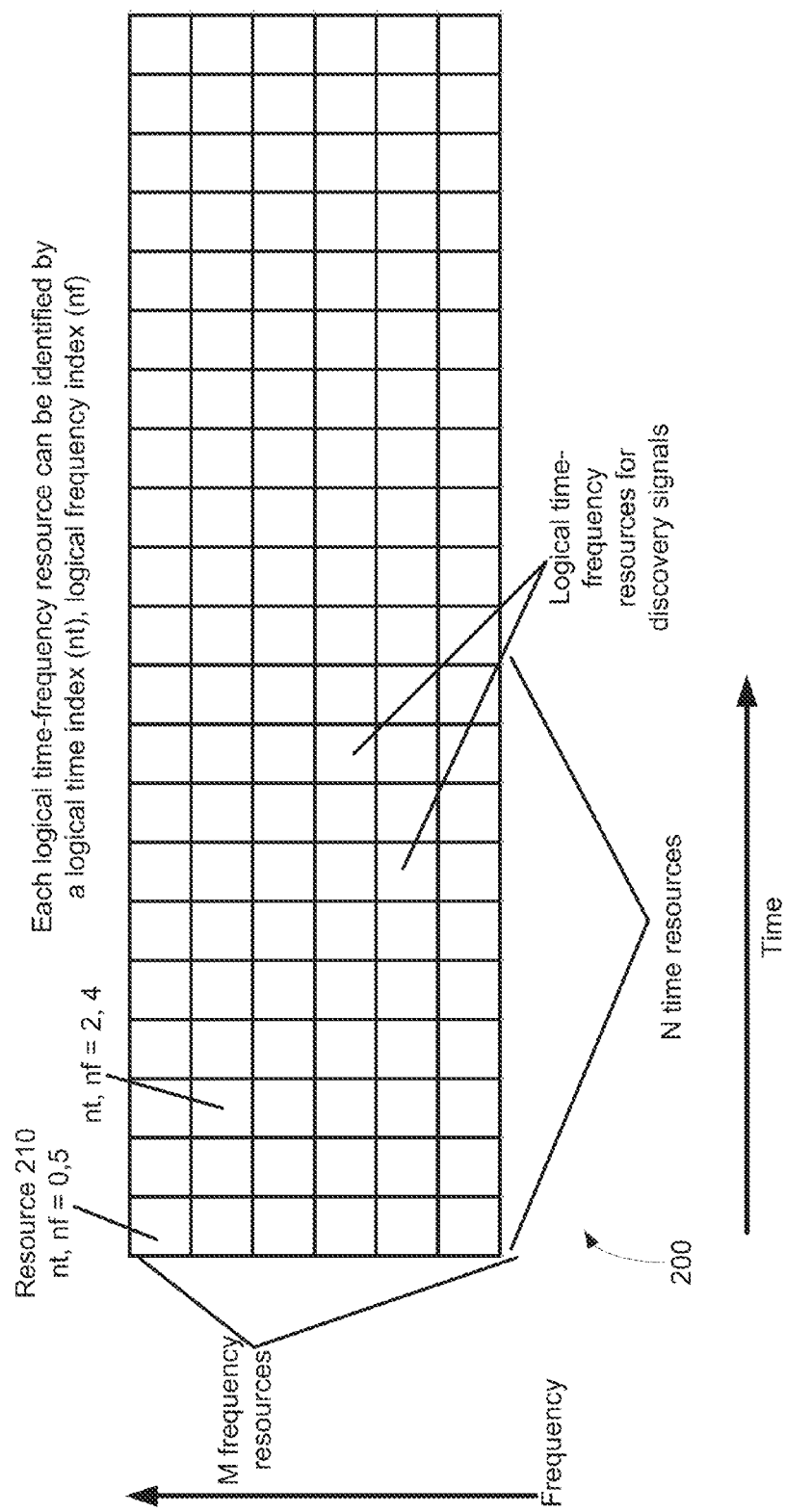
FIG. 2 is a diagram illustrating resources according to an example implementation.

FIG. 2 is a diagram illustrating resources according to an example implementation. In this illustrative example, there may be discovery resources available for use by the user devices to transmit their discovery signals. For example, the discovery resources of each discovery period may include logical time-frequency resources based on an array 200 of M frequency resources (e.g., M physical resource blocks) by N time resources (e.g., where each time resource may correspond to a subframe or portion of a subframe). An example discovery period may be between 1 second and 11 seconds, for example, such as between 320 ms and 1024 ms, as another example. Within the array 200 of M×N logical time-frequency resources (FIG. 2), each time-frequency resource (or each discovery resource, shown as one block or square within the array) may be identified by, or may correspond to, a logical time index (nt) and a logical frequency index (nf). For example, discovery resource 210 (located in the upper left-hand corner of array 210) may include a logical time index of nt=0, and a logical frequency index of nf=5. For example, a user device may transmit a discovery signal at least once per discovery period, with each discovery signal being transmitted via one of the logical time-frequency resources (discovery resources).

As noted, each user device may transmit a ProSe discovery signal at least once per discovery period. In some example implementations, a user device may transmit a discovery signal multiple times during a discovery period to improve range of discovery, for example. According to an example implementation, a user device may transmit a first discovery signal during a first discovery period, and then may retransmit (e.g., transmit a second occurrence, third occurrence, fourth occurrence, etc., of a transmission of) the first discovery signal during the first discovery period. Thus, in one example implementation, each retransmission (or transmitting subsequent occurrences) of the discovery signal during a discovery period may be with the same discovery information content as was first transmitted during the discovery period. On the other hand, according to an example implementation, a first occurrence of a discovery signal during a subsequent discovery period may be with the same information as a previous discovery signal (for a previous discovery period), or may be a different discovery signal (e.g., one or more fields of the discovery signal may be different for the discovery signal of the new discovery period). Even if the retransmission is made with the same information content, the actually transmitted signal may change for the retransmission as e.g. different redundancy versions of the encoded bits may be used for the first transmission and retransmissions or scrambling of bits may be different. However, the changes, like the changes in the redundancy version or scrambling, are such that they do not prevent the receiving device from combining the received first and retransmissions for more reliable detection.

The resources used by a user device to transmit one or more subsequent discovery signals may be deterministically related to a resource used to transmit an earlier discovery signal. For example, after a user device transmits a first discovery signal via a first time-frequency resource during a first discovery period, the user device may use a time-frequency hopping pattern to determine a time-frequency resource(s) to be used for transmitting one or more subsequent discovery signals. For example, a time-frequency hopping pattern may define how a discovery resource used by a user device should change or vary (either in time and/or frequency) based on a discovery resource used initially and a rule(s). A rule may include, for example, an equation, function, representation or relationship between values or variables, as examples, that may identify a time-frequency resource for a user device to transmit one or more subsequent/future discovery signals based on at least the time-frequency resource used initially (or previously) by the user device to transmit a discovery signal. Therefore, based on the time-frequency hopping pattern, the resources for one or more future/subsequent discovery signal transmissions from a user device may be deterministically linked to a resource used for a previous/earlier discovery signal transmission for the user device.

As noted, a resource (or a location of a resource within a discovery period) may be identified by a logical time index (nt) and a logical frequency index (nf). Therefore, according to an example implementation, a user device may use a time-frequency hopping pattern to determine a logical time index and a logical frequency index of a second resource for transmitting a subsequent discovery signal, based on a logical time index and logical frequency index of a first resource that was used to transmit an earlier or previous discovery signal.

A user device may use a time-frequency hopping pattern to determine a second time-frequency resource (e.g., identify a logical time index and logical frequency index of the second time-frequency resource for transmitting a second discovery signal) based on a first time-frequency resource used to transmit a first discovery signal.

According to an example implementation, inter-period (or between discovery periods) hopping (or change in time-frequency resources for discovery signals from a user device) may be determined based on an inter-period hopping pattern or an inter-period rule. Whereas, intra-period (or within a discovery period) hopping (or change in time-frequency resources for discovery signals from a user device within the same discovery period) may be determined based on an intra-period hopping pattern or an intra-period rule, according to an example implementation.

According to an illustrative example, the inter-period hopping pattern or rule may be cell-specific (e.g., maybe different between different cells). Whereas, the intra-period hopping pattern or rule may be common (or the same) among a plurality of cells to allow user devices of other cells to receive multiple discovery signals from a user device during a discovery period, and then possibly combine them, e.g., via receive combining (such as Chase combining). If the intra-period hopping patterns or rules were cell specific, combining would require information of the cell specific patterns and rules to be shared between UEs in different cells, which would mean complex and radio resource consuming procedures.

Figure 3:
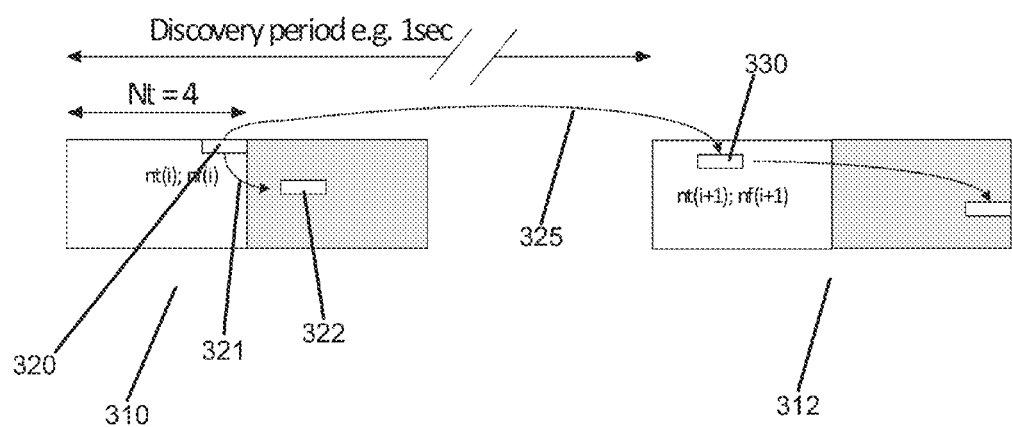
FIG. 3 is a diagram illustrating determining of resources according to an example implementation.

FIG. 3 is a diagram illustrating determining of resources according to an example implementation. Two discovery periods are shown in FIG. 3, including a first discovery period 310 and a second discovery period 312. A user device transmits a first occurrence of a first discovery signal via a first discovery resource 320 during the first discovery period 310. The first discovery resource may be identified by logical time index nt(i) and logical frequency index nf(i), where i corresponds to the first discovery period 310 (e.g., i=1). The user device may determine (indicated by line 321) a second discovery resource 322 (e.g., including logical time index and logical frequency index) within the first discovery period 310 for transmitting a second occurrence of the first discovery signal based on an intra-period rule or an intra-period hopping pattern and the first discovery resource 320 (or the logical time index and logical frequency index of the first discovery resource 320). The user device may then transmit a second occurrence of the first discovery signal during the second discovery resource 322. Thus, the transmission of the first discovery signal within the first discovery period 310 occurs a first time via first discovery resource 320 and is repeated (or a transmission occurs a second time) via the second discovery resource 322. Similarly, the first discovery signal may be retransmitted multiple times (e.g., 2, 3, 4, 5, . . . times) within the first discovery period 310.

Similarly, also referring to FIG. 3, the user device may determine (indicated by line 325) a third discovery resource 325 (e.g., including logical time index and logical frequency index of the third discovery resource) within the second discovery period 312 for transmitting a first occurrence of a second discovery signal based on an inter-period rule or an inter-period hopping pattern and the first discovery resource 320. The user device may then transmit the first occurrence of the second discovery signal via the third discovery resource 322 within or during the second discovery period 312.

Therefore, according to an example implementation, a user device may transmit in a proximity-based services wireless network via a first time-frequency resource (a first discovery resource), a first occurrence of a first discovery signal for the user device during a first discovery period. The user device may determine a second time-frequency resource (or a logical time index and a logical frequency index for such second time-frequency resource) for transmitting a second occurrence of the first discovery signal during a first discovery period based on the first time-frequency resource and a first rule (e.g., an intra-period rule). Similarly, multiple resources may be determined for transmitting each of multiple retransmissions/occurrences of the first discovery signal during the first discovery period. Also, the user device may determine a third time-frequency resource (or a logical time index and a logical frequency index for such third time-frequency resource) for transmitting a first occurrence of a second discovery signal during a second discovery period based on the first time-frequency resource and a second rule (e.g., an inter-period rule).

According to an example implementation, the first rule (e.g., intra-period rule) and the second rule (e.g., the inter-period rule) may each be provided as one of a plurality of different rule types, including for example:

1) A rule that determines a time index adjustment associated with the first logical frequency index of the first resource, and then determines the logical time index of the second time-frequency resource (for transmitting a second occurrence of the first discovery signal, intra-period) based on the first logical time index of the first resource and the time index adjustment. For example, determining the time index adjustment may include determining a cyclical shift amount associated with the first logical frequency index of the first resource. And, determining the logical time index of the second time-frequency resource may include performing a cyclical shift, by the cyclical shift amount, of N time-frequency resources having the first logical frequency index, including cyclically shifting the first logical frequency index by the cyclical shift amount. Similarly, a frequency index offset may be determined, such as a re-ordering or shuffling of frequency indexes, e.g., to provide frequency diversity. This rule may also be applied to inter-period hopping to determine a logical time index of the third time-frequency resource to transmit a first occurrence of the second discovery signal in a second discovery period.

2) a rule that includes hopping pattern equations 1) and 2) below, with a different set of parameters (e.g., a, b, c) used for intra-period rule and intra-period rule. Thus, for example, a first set of intra-period parameters (a1, b1 and c1), used for multiple cells, may be used in the hopping pattern equations 1) and 2) for the intra-period rule. And, a second set of inter-period parameters (a2, b2 and c2), which may be cell-specific, may be used in the hopping pattern equations 3) and 4) for the inter-period rule.

The hopping pattern equations for the intra-period rule may include the following:
1) second logical time index=mod(c*nf+nt*Nf+a, Nt), and
2) second logical frequency index=mod(floor((nf+nt*Nf)/Nt)+b, NO, wherein mod is a modulo operator, floor is a floor operator, nt is the first logical time index, of is the first logical frequency index, Nt is a total number discovery resources in time divided by a number of total discovery signal transmissions within a discovery period, Nf is a total number of discovery resources in frequency, and wherein a, b and c may be common parameters for multiple cells, where intra-period parameters a1, b1 and c1 may be used for a, b and c.

The hopping pattern equations for the inter-period rule may include the following:
3) third logical time index=mod(c*nf+nt*Nf+a, Nt), and
4) third logical frequency index=mod(floor((nf+nt*Nf)/Nt)+b, NO, wherein mod is a modulo operator, floor is a floor operator, nt is the first logical time index, of is the first logical frequency index, Nt is a total number discovery resources in time divided by a number of total discovery signal transmissions within a discovery period, Nf is a total number of discovery resources in frequency, and wherein a, b and c may be cell-specific, where inter-period parameters a2, b2 and c2 may be used for a, b and c. According to an example implementation, hopping pattern equations 1) and 2) may be the same as or similar to equations 3) and 4), but different sets of parameters a, b and c may be used. Hopping pattern equations 1)-4) are merely illustrative examples, and other equations or functions may be used.

There are alternative ways to map the logical time resources to the physical time resources. One way is that nt of the first transmission is mapped to one of the first Nt subframes in the discovery period (assuming a discovery signal is transmitted in a subframe) and the logical time index of retransmission (second logical time index in the equation 1) is mapped to one of the last Nt subframes of the discovery period. This corresponds to the illustration in FIG. 3. Another simple way is that the subframes for the first transmission and the retransmissions are interleaved: the first logical time resource of a first transmission maps to the first physical time resource, the first logical time resource of a retransmission maps to the second physical time resource, and so on.

An example will be described where a time index adjustment and/or frequency index adjustment is applied to a first time-frequency resource to determine a second time-frequency resource, e.g., according to a rule or hopping pattern, e.g., to transmit two occurrences of a discovery signal, or to transmit two occurrences of a scheduling assignment. The scheduling announcement transmitted by a user device may indicate resources that will be used by the user device to transmit data or other signals, for example.

According to an example implementation, a starting Tx pattern (which may be called a "reference pattern") and a Toeplitz matrix may be used to map the transmission patterns derived from a reference pattern to physical resources. In such case, the mapping from the transmission patterns derived from a reference pattern is made regular through the definition of matrices P and its shuffled versions.

According to an example implementation, first transmissions of discovery signals (or first transmissions of a scheduling assignment) from user devices are denoted by a M×N matrix P. Each index (or number) in the matrix P represents a time-frequency resource used to transmit a first discovery signal. Each row represents resources having a common frequency index. Each column of P represents resources having a common time index.

$$P = \begin{bmatrix} 1 & 2 & 3 & \ldots & N-2 & N-1 & N \\ N+1 & N+2 & N+3 & \ldots & 2N-2 & 2N-1 & 2N \\ \vdots & \vdots & \vdots & \vdots & \vdots & \vdots & \vdots \\ (M-1)N+1 & (M-1)N+2 & (M-1)N+3 & \ldots & MN-2 & MN-1 & MN \end{bmatrix}_{M \times N}$$

The second transmissions by user devices to transmit a second discovery signal, or to transmit a second scheduling assignment, are denoted by a matrix P' that may be derived or obtained from matrix P, by various functions or operations applied to P. According to an illustrative example, matrix P' may be obtained by applying a different time index adjustment for each row. In one illustrative example, the time index adjustment may include determining a different cyclical shift amount for each row (or each logical frequency index), and then cyclically shifting each row (or resources having a same logical frequency index) by the cyclical shift amount. For example, a top or first row of matrix P (resources having a first frequency index) may be shifted once (in time) to the left, the second row (resources having a second frequency index) may be shifted twice to the left, the third row (resources having a third frequency index) may be shifted three times to the left, and the fourth row (resources having a fourth frequency index) may be shifted four times (in time) to the left.

row 1 of P' is obtained through cyclically shifting of row 1 of P once:
row 2 of P' is obtained through cyclically shifting of row 2 of P twice:
row 3 of P is obtained through cyclically shifting of row 3 of P 3 times:
. . .
row M of P' is obtained through cyclically shifting of row M of P M times, according to an illustrative example implementation.

It can be seen that patterns (or pattern indexes) 1, 2, 3, . . . , N are derived from the reference pattern (or pattern index) 1+x, and patterns N+1, N+2, . . . , 2N are derived from the reference pattern $1+x^2$, . . . , patterns (M−1)N+1, (M−1)N+2, . . . , MN are derived from the reference pattern $1+x^M$.

For N=8, M=7, with three transmissions, with 7 reference patterns $1+x+x^2$, $1+x+x^3$, $1+x+x^4$, $1+x^2+x^3$, $1+x^2+x^4$, $1+x^2+x^5$, $1+x^3+x^4$, patterns 1,2,3,4,5,6,7,8 are derived from $1+x+x^2$,
patterns 9,10,11,12,13,14,15,16 are derived from $1+x+x^3$,
patterns 17,18,19,20,21,22,23,24 are derived from $1+x+x^4$,
patterns 25,26,27,28,29,30,31,32 are derived from $1+x^2+x^3$,
patterns 33,34,35,36,37,38,39,40 are derived from $1+x^2+x^4$,
patterns 41,42,43,44,45,46,47,48 are derived from $1+x^2+x^5$,
patterns 49,50,51,52,53,54,55,56 are derived from $1+x^3+x^4$ we have $$P = \begin{bmatrix} 1 & 2 & 3 & 4 & 5 & 6 & 7 & 8 \\ 9 & 10 & 11 & 12 & 13 & 14 & 15 & 16 \\ 17 & 18 & 19 & 20 & 21 & 22 & 23 & 24 \\ 25 & 26 & 27 & 28 & 29 & 30 & 31 & 32 \\ 33 & 34 & 35 & 36 & 37 & 38 & 39 & 40 \\ 41 & 42 & 43 & 44 & 45 & 46 & 47 & 48 \\ 49 & 50 & 51 & 52 & 53 & 54 & 55 & 56 \end{bmatrix},$$

$$P' = \begin{bmatrix} 8 & 1 & 2 & 3 & 4 & 5 & 6 & 7 \\ 16 & 9 & 10 & 11 & 12 & 13 & 14 & 15 \\ 24 & 17 & 18 & 19 & 20 & 21 & 22 & 23 \\ 31 & 32 & 25 & 26 & 27 & 28 & 29 & 30 \\ 39 & 40 & 33 & 34 & 35 & 36 & 37 & 38 \\ 47 & 48 & 41 & 42 & 43 & 44 & 45 & 46 \\ 54 & 55 & 56 & 49 & 50 & 51 & 52 & 53 \end{bmatrix},$$

$$P'' = \begin{bmatrix} 2 & 3 & 4 & \ldots & N-1 & N & 1 \\ N+3 & N+4 & N+5 & \ldots & 2N & N+1 & N+2 \\ \vdots & \vdots & \vdots & \vdots & \vdots & \vdots & \vdots \\ (M-1)N+1+M & (M-1)N+2+M & (M-1)N+3+M & \ldots & (M-1)N-2+M & (M-1)N-1+M & (M-1)N+M \end{bmatrix}_{M \times N}$$

$$P'' = \begin{bmatrix} 7 & 8 & 1 & 2 & 3 & 4 & 5 & 6 \\ 14 & 15 & 16 & 9 & 10 & 11 & 12 & 13 \\ 21 & 22 & 23 & 24 & 17 & 18 & 19 & 20 \\ 30 & 31 & 32 & 25 & 26 & 27 & 28 & 29 \\ 37 & 38 & 39 & 40 & 33 & 34 & 35 & 36 \\ 44 & 45 & 46 & 47 & 48 & 41 & 42 & 43 \\ 53 & 54 & 55 & 56 & 49 & 50 & 51 & 52 \end{bmatrix}$$

For example, as patterns 17,18,19,20,21,22,23,24 are derived from $1+x+x^4$, so in P', [17 18 19 20 21 22 23 24] is shifted towards the right for 1 element compared to P, and in P'', [17 18 19 20 21 22 23 24] is shifted towards the right for 4 elements compared to P, i.e. the number of cyclic shifts is determined by the exponent of the relevant term in the reference pattern polynomial. The number of shuffled matrices equals to the number of repetitions. For different values for M and N and the number of transmissions, similar representations as P, P', P'' can be derived. Hence the disclosed procedure provides a systematic way to represent the patterns from the combinatorial design as shuffled matrices and the pattern mapping into physical resources.

One repetition of transmission can be arranged by joining the matrices in parallel or consecutively:

$$\begin{bmatrix} P \\ P' \end{bmatrix}_{2M \times N}$$

or $[P, P']_{M \times 2N}$. There are several alternative ways to generate more than one retransmission. As an example we consider user equipment transmitting six signals in a discovery period. One way to generate six transmissions is that the hopping patterns are repeated:

$$\begin{bmatrix} PPP \\ P'P'P' \end{bmatrix}$$

or [P P' P P' P P']. Then each column of matrices P and P' represents one time resource for transmission, as explained above. Another alternative is that each column of matrices P or P' represents three time resources for discovery signal transmission and the patterns are repeated as $$\begin{bmatrix} P \\ P' \end{bmatrix}$$

or [P,P']. In this case a user device would transmit in two occurrances of three consecutive time resources such that one occurrence of the three resources is treated like one time resource in the mapping from matrix P or P'.

By shifting the second (or subsequent) transmissions of a discovery signal within the same discovery period, this may improve a half-duplex problem where a user device transmitting discovery signals at the same time as another user device will be unable to hear or detect the transmitted discovery signals of the other user device. Thus, by determining a second discovery resource by applying at least a time index adjustment (e.g., based on a frequency index) to the first discovery resource, this makes it less likely that half-duplex user devices will be transmitting both signals (e.g., discovery signals or scheduling assignments) at the same time.

Figure 4:
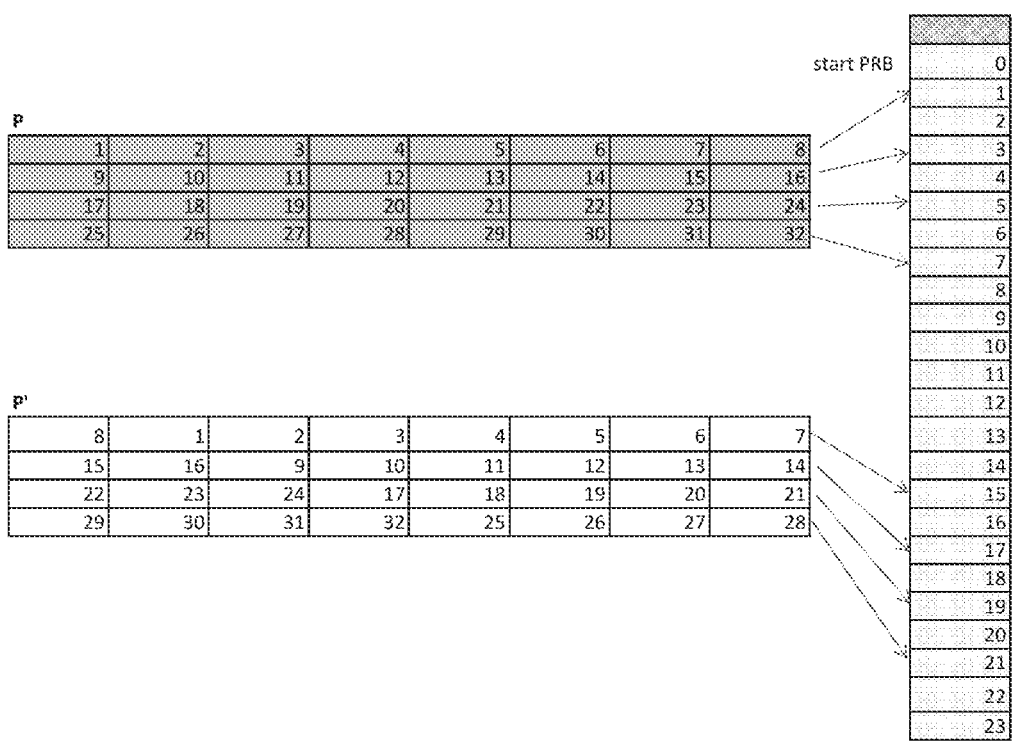
FIG. 4 is a diagram illustrating a mapping of each row (or resources of each logical frequency index) to a physical resource block or PRB according to an example implementation.

FIG. 4 is a diagram illustrating a mapping of each row (or resources of each logical frequency index) to a physical resource block or PRB according to an example implementation. As noted each row of matrix P in FIG. 4 corresponds to a logical frequency index (e.g., each index of a row has the same logical frequency index). As shown in FIG. 4, row 1 (including pattern indexes 1, 2, 3, 4, 5, 6, 7 and 8), row 2 (including pattern indexes 9-16), row 3 (including pattern indexes 17-24) and row 4 (including indexes 25-32) of matrix P are mapped to PRBs 1, 3, 5 and 7, respectively.

The matrix P' (which may identify the resources that may be used for a user device to transmit or retransmit a discovery signal) may result when a time index adjustment (e.g., a cyclical shift amount) is applied to each row of matrix P. For example, pattern index 1 maps to PRB1/PRB15 for matrix P/P'. Thus, pattern index 1, may be used to transmit a first discovery signal at PRB1 (as indicated by matrix P), and pattern index 1 may be used to retransmit the discovery signal at PRB15 (as indicated by matrix P'). Thus, the time index adjustment to matrix P may provide time diversity, e.g., to assist with the half-duplex problem, while the mapping of the parameter 1 to different PRBs in matrix P and P' may provide frequency diversity. Note, if pattern index 1 is used by a user device, then PRB 1 is used for a first discovery signal transmission in a discovery period, while PRB 15 will be used for a repetition or repeating a transmission (or transmitting a second occurrence) of the discovery signal in the discovery period. Thus, with respect to this user device, there is a chunk of frequency resources or PRBs between occupied PRBs 1 and 15, or 14 available PRBs which may be allocated to other user devices or for other purposes.

Figure 5:
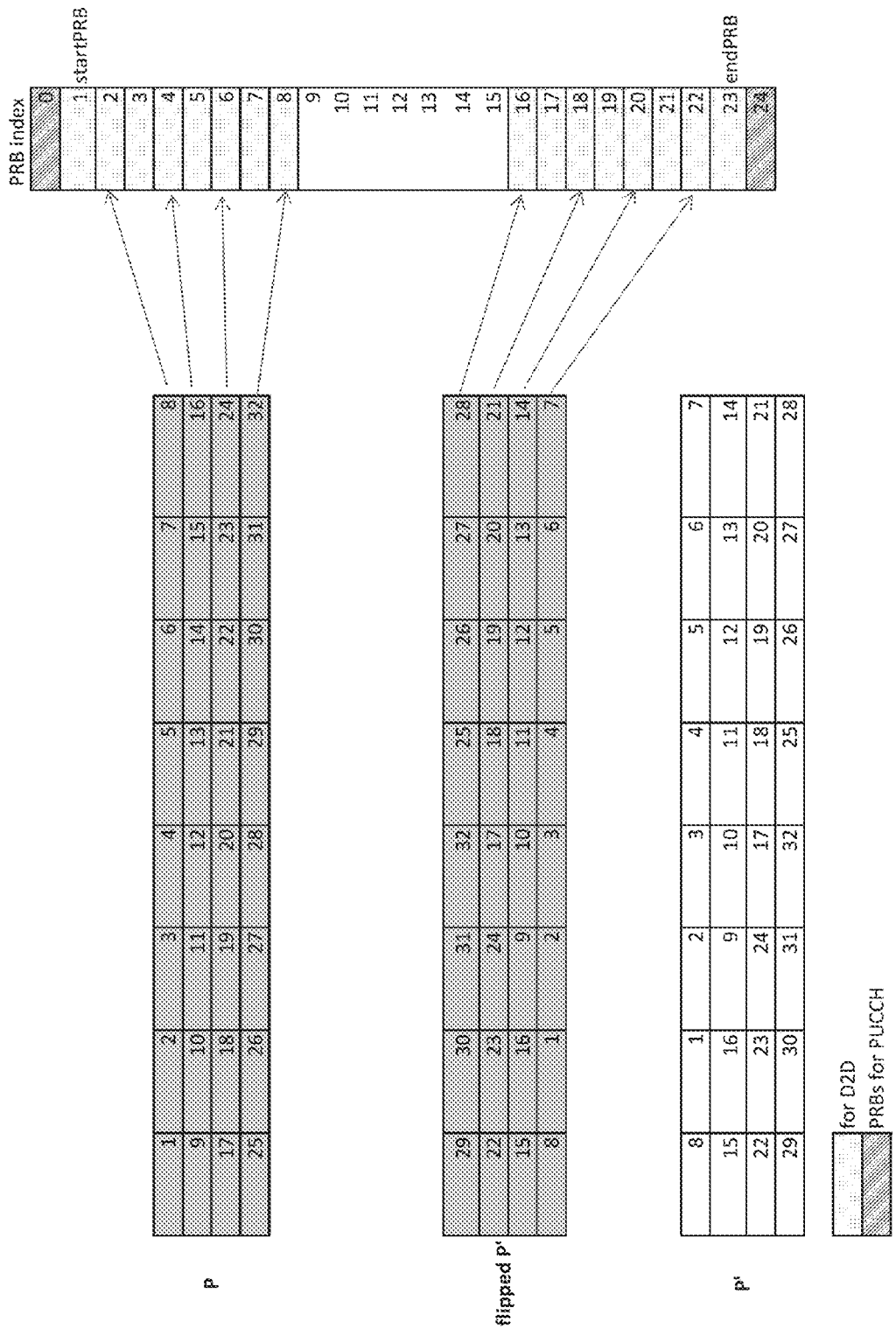
FIG. 5 is a diagram illustrating a mapping of each row (or resources of each logical frequency index) to a physical resource block or PRB according to another example implementation.

FIG. 5 is a diagram illustrating a mapping of each row (or resources of each logical frequency index) to a physical resource block or PRB according to another example implementation. In the example implementation shown in FIG. 5, the matrix P' may be obtained from the matrix P in the same manner as in FIG. 4, e.g., by applying a time index adjustment (e.g., a cyclical shift amount) to each row of matrix P. In addition, one or more rows of matrix P' may be shuffled (e.g., flipped) to obtain the matrix flipped P'. Thus, in this example, matrix flipped P' may be obtained by flipping the matrix P' upside down, which reorders the rows of matrix P' In this illustrative example, index 1 of matrix P is mapped to PRB 2, while pattern index 1 of flipped P' maps to PRB 22. Thus, by reordering the rows (or resources having a same logical frequency index) of matrix P', greater frequency diversity (or greater distance between PRBs) may be obtained between an initial or first transmission of a discovery signal (indicated as PRB 2 for index 1 of matrix P), and a second transmission or retransmission of the discovery signal within the discovery period (indicated as PRB 22 for index 1 of matrix flipped P'). Thus, in this case of the flipped P', a chunk of unused frequency resources of PRBs of 20 PRBs is available to be assigned to other user devices or other purposes. Thus, the reordering of rows, e.g., flipping of matrix P', may provide increased frequency diversity, as well as a larger contiguous chunk of resources (e.g., 22 PRBs for flipped P') to be re-assigned for other purposes, as compared to using matrix P' (shown in FIG. 4, which only provides a chunk of 14 unused PRBs to be reassigned).

Figure 6:
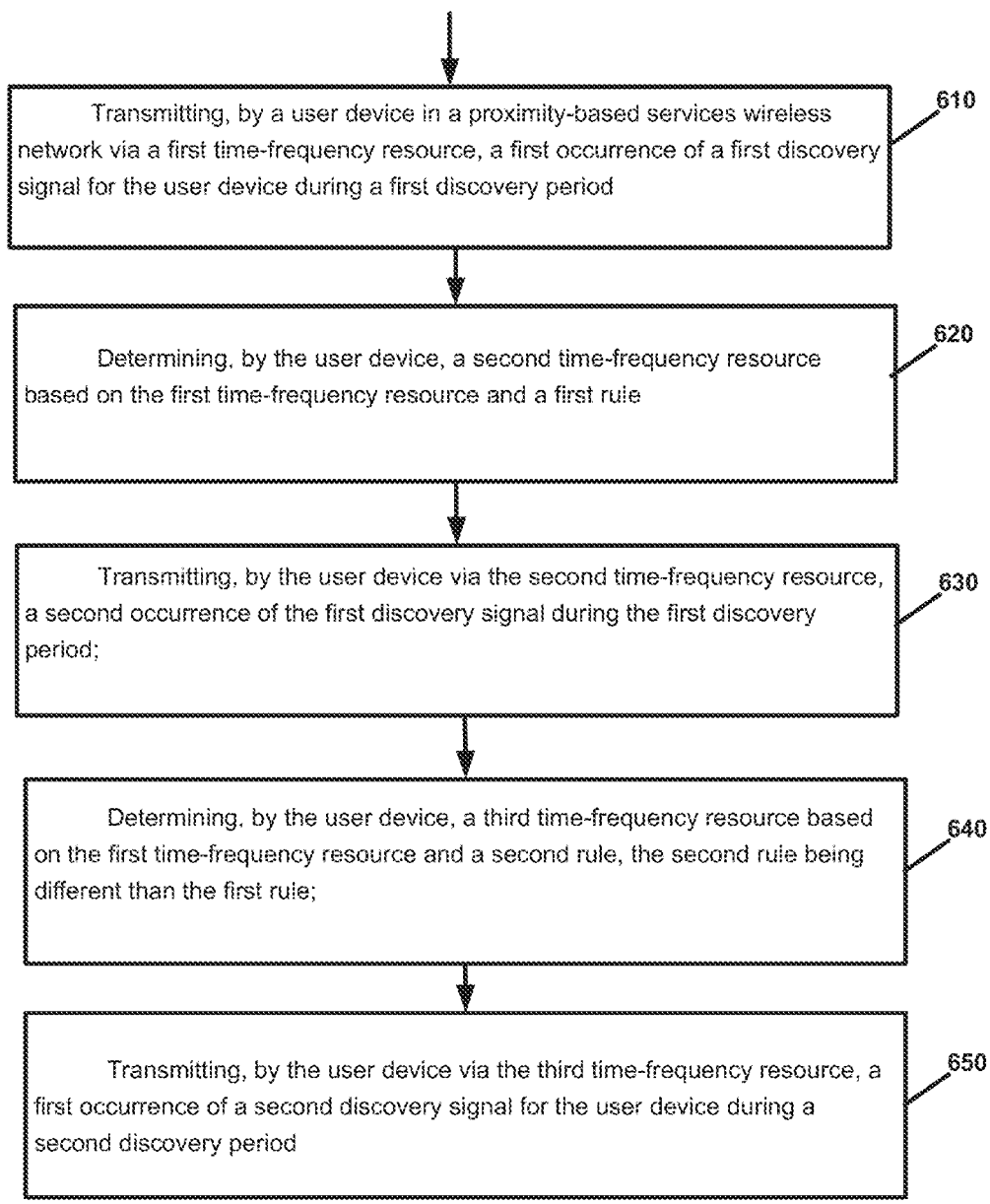
FIG. 6 is a flow chart illustrating operation of a user device according to an example implementation.

FIG. 6 is a flow chart illustrating operation of a user device according to an example implementation. Operation 610 includes transmitting, by a user device in a proximity-based services wireless network via a first time-frequency resource, a first occurrence of a first discovery signal for the user device during a first discovery period. Operation 620 includes determining, by the user device, a second time-frequency resource based on the first time-frequency resource and a first rule. Operation 630 includes transmitting, by the user device via the second time-frequency resource, a second occurrence of the first discovery signal during the first discovery period. Operation 640 includes determining, by the user device, a third time-frequency resource based on the first time-frequency resource and a second rule, the second rule being different than the first rule. Operation 650 includes transmitting, by the user device via the third time-frequency resource, a first occurrence of a second discovery signal for the user device during a second discovery period.

According to an example implementation of the method of FIG. 6, the first rule may be used for a plurality of cells and the second rule is cell-specific.

According to an example implementation of the method of FIG. 6, the first rule and the second rule are based on a same function whose input is a first logical time index and a first logical frequency index of the first time-frequency resource and a set of rule-specific parameters, wherein a first set of the parameters are used as an input to the function when the function is applied for the first rule, the first set of parameters being applicable to a plurality of cells, and wherein a second set of cell-specific parameters are used as an input to the function when the function is applied for the second rule.

According to an example implementation of the method of FIG. 6, the transmitting may include transmitting, by a user device in a proximity-based services wireless network via a first time-frequency resource identified by a first logical time index and a first logical frequency index, a first occurrence of a first discovery signal during a first discovery period, wherein the determining, by the user device, a second time-frequency resource comprises determining, by the user device, a second logical time index and a second logical frequency index for the second time-frequency resource based on the first logical time index, the first logical frequency index and the first rule.

According to an example implementation of the method of FIG. 6, the transmitting may include transmitting, by a user device in a proximity-based services wireless network via a first time-frequency resource identified by a first logical time index and a first logical frequency index, a first occurrence of a first discovery signal during a first discovery period, wherein the determining, by the user device, a third time-frequency resource comprises determining, by the user device, a third logical time index and a third logical frequency index for the third time-frequency resource based on the first logical time index, the first logical frequency index and the second rule.

According to an example implementation of the method of FIG. 6, the discovery signal may include a proximity-based services discovery request that includes one or more of the following: a proximity-based services application identifier; a user device identity for the user device; an address for the user device; and an application identity that identifies an application that triggered transmitting the discovery signal.

According to an example implementation of the method of FIG. 6, the first time-frequency resource is identified by a first logical time index and a first logical frequency index and the second time-frequency resource is identified by a second logical time index and a second logical frequency index, wherein the second logical time index and the second logical frequency index are determined based on the following, wherein a first set of parameters are used for variables a, b and c to determine the second time logical time index and the second logical frequency index based upon the following: second logical time index=$\text{mod}(c*nf+nt*Nf+a, Nt)$, and second logical frequency index=$\text{mod}(\text{floor}((nf+nt*Nf)/Nt)+b, Nf)$, wherein mod is a modulo operator, floor is a floor operator, nt is the first logical time index, of is the first logical frequency index, Nt is a total number discovery resources in time divided by a number of total discovery signal transmissions within a discovery period, Nf is a total number of discovery resources in frequency, and wherein a, b and c are common parameters for multiple cells.

According to an example implementation of the method of FIG. 6, the first time-frequency resource is identified by a first logical time index and a first logical frequency index, the third time-frequency resource is identified by a third logical time index and a third logical frequency index wherein the third logical time index and the third logical frequency index are determined based on the following, wherein a third set of parameters are used for variables a, b and c to determine the third logical time index and the third logical frequency index based upon the following: third logical time index=$\text{mod}(c*nf+nt*Nf+a, Nt)$, and third logical frequency index=$\text{mod}(\text{floor}((nf+nt*Nf)/Nt)+b, Nf)$, wherein mod is a modulo operator, floor is a floor operator, nt is the first logical time index, of is the first logical frequency index, Nt is a total number discovery resources in time divided by a number of total discovery signal transmissions within a discovery period, Nf is a total number of discovery resources in frequency, and wherein a, b and c are cell-specific.

According to an example implementation of the method of FIG. 6, the first time-frequency resource is identified by a first logical time index and a first logical frequency index, and wherein the determining, by the user device, a second time-frequency resource includes: determining a time index adjustment associated with the first logical frequency index; and, determining, by the user device, a second logical time index of the second time-frequency resource for transmitting from the user device the second occurrence of the first discovery signal within the first discovery period, the second logical time index being determined based on the first logical time index and the time index adjustment associated with the first logical frequency index.

According to an example implementation of the method of FIG. 6, the time index adjustment associated with the first logical frequency index may include a cyclical shift amount assigned to the first logical frequency index, and wherein the determining, by the user device, of the second logical time index of the second time-frequency resource includes: determining a first logical time index of the first time-frequency resource, the first time-frequency resource being one of N time-frequency resources having the first logical frequency index; performing a cyclical shift, by the cyclical shift amount assigned to the first logical frequency index, of the determined logical time indexes of the N time-frequency resources, including performing a cyclical shift of the first logical time index; and determining the second logical time index of the second time-frequency resource as the cyclically shifted first logical time index.

According to an example implementation of the method of FIG. 6, the first time-frequency resource is identified by a first logical time index and a first logical frequency index, the determining, by the user device, a third time-frequency resource may include: determining a time index adjustment associated with the first logical frequency index; determining, by the user device, a third logical time index of the third time-frequency resource for transmitting from the user device the first occurrence of the second discovery signal within the second discovery period, the third logical time index being determined based on the first logical time index and the time index adjustment associated with the first logical frequency index.

According to another example implementation, a computer program product is provided for a computer, including software code portions for performing the steps of any of the methods, functions operations or claims described herein, when said product is run on the computer. An apparatus may include means for carrying out any of the methods, functions operations or claims described herein.

According to an example implementation, an apparatus may include at least one processor and at least one memory including computer instructions, when executed by the at least one processor, cause the apparatus to: transmit, by a user device in a proximity-based services wireless network via a first time-frequency resource, a first occurrence of a first discovery signal for the user device during a first discovery period; determine, by the user device, a second time-frequency resource based on the first time-frequency resource and a first rule; transmit, by the user device via the second time-frequency resource, a second occurrence of the first discovery signal during the first discovery period; determine, by the user device, a third time-frequency resource based on the first time-frequency resource and a second rule, the second rule being different than the first rule; and transmit, by the user device via the third time-frequency resource, a first occurrence of a second discovery signal for the user device during a second discovery period.

According to another example implementation, a computer program product may include a computer-readable storage medium and storing executable code that, when executed by at least one data processing apparatus, is configured to cause the at least one data processing apparatus to perform a method comprising: transmitting, by a user device in a proximity-based services wireless network via a first time-frequency resource, a first occurrence of a first discovery signal for the user device during a first discovery period; determining, by the user device, a second time-frequency resource based on the first time-frequency resource and a first rule; transmitting, by the user device via the second time-frequency resource, a second occurrence of the first discovery signal during the first discovery period; determining, by the user device, a third time-frequency resource based on the first time-frequency resource and a second rule, the second rule being different than the first rule; transmitting, by the user device via the third time-frequency resource, a first occurrence of a second discovery signal for the user device during a second discovery period.

According to an example implementation, an apparatus may include means (904 and/or 902A/902B, FIG. 9) for transmitting, by a user device in a proximity-based services wireless network via a first time-frequency resource, a first occurrence of a first discovery signal for the user device during a first discovery period; means (904 and/or 902A/902B) for determining, by the user device, a second time-frequency resource based on the first time-frequency resource and a first rule; means for transmitting, by the user device via the second time-frequency resource, a second occurrence of the first discovery signal during the first discovery period; means (904 and/or 902A/902B) for determining, by the user device, a third time-frequency resource based on the first time-frequency resource and a second rule, the second rule being different than the first rule; and means (904 and/or 902A/902B) for transmitting, by the user device via the third time-frequency resource, a first occurrence of a second discovery signal for the user device during a second discovery period.

Figure 7:
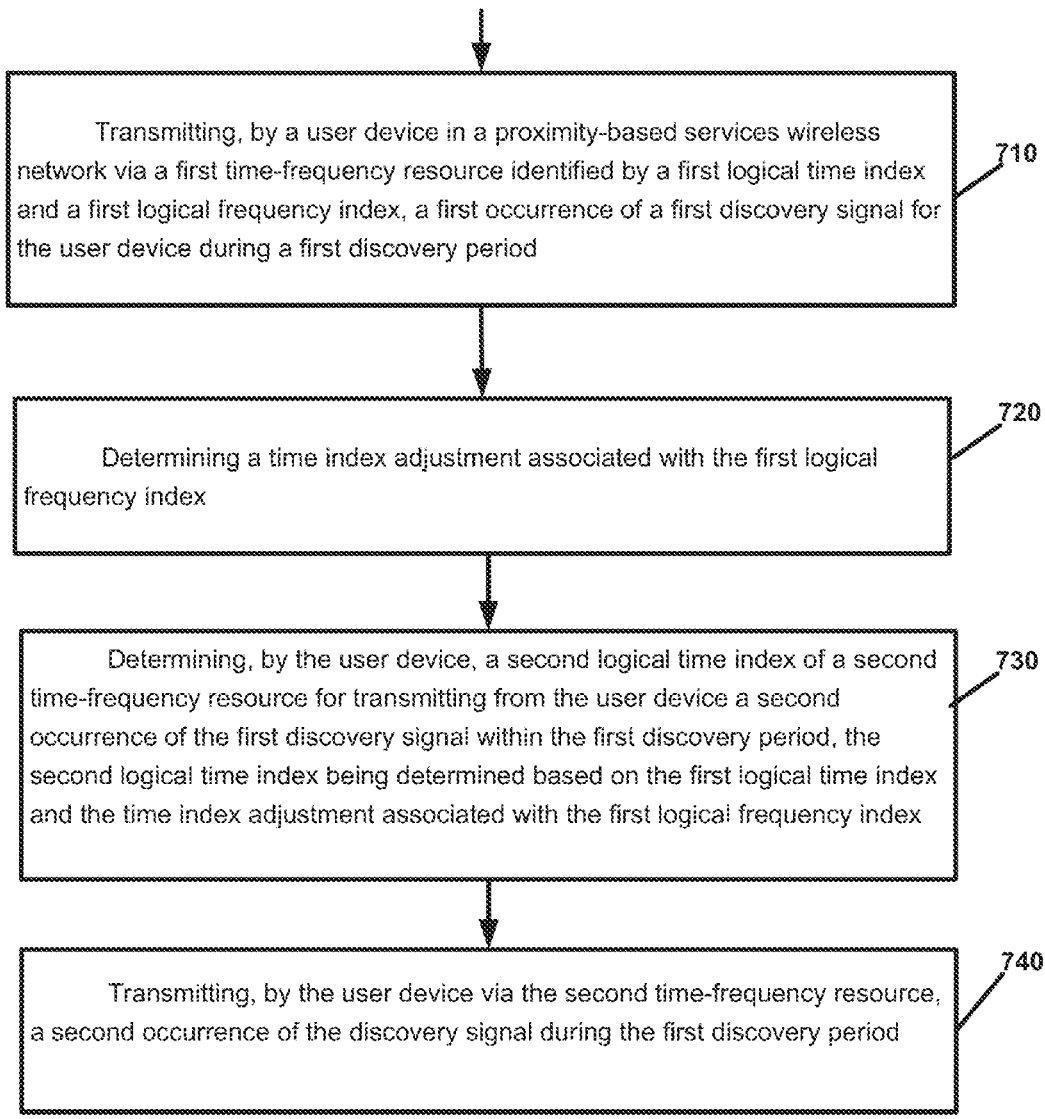
FIG. 7 is a flow chart illustrating operation of a user device according to another example implementation.

FIG. 7 is a flow chart illustrating operation of a user device according to another example implementation. Operation 710 may include transmitting, by a user device in a proximity-based services wireless network via a first time-frequency resource identified by a first logical time index and a first logical frequency index, a first occurrence of a first discovery signal for the user device during a first discovery period. Operation 720 may include determining a time index adjustment associated with the first logical frequency index. Operation 730 may include determining, by the user device, a second logical time index of a second time-frequency resource for transmitting from the user device a second occurrence of the first discovery signal within the first discovery period, the second logical time index being determined based on the first logical time index and the time index adjustment associated with the first logical frequency index. And, operation 740 may include transmitting, by the user device via the second time-frequency resource, a second occurrence of the discovery signal during the first discovery period.

According to an example implementation of the method of FIG. 7, the time index adjustment associated with the first logical frequency index may include a cyclical shift amount assigned to the first logical frequency index; and wherein the determining, by the user device, of the second logical time index of the second time-frequency resource comprises: determining a logical time index of the first time-frequency resource, the first time-frequency resource being one of N time-frequency resources having the first logical frequency index; performing a cyclical shift, by the cyclical shift amount assigned to the first logical frequency index, of the determined logical time indexes of the N time-frequency resources, including performing a cyclical shift of the first logical time index; and determining the second logical time index of the second time-frequency resource as the cyclically shifted first logical time index.

According to an example implementation, an apparatus may include at least one processor and at least one memory including computer instructions, when executed by the at least one processor, cause the apparatus to: transmit, by a user device in a proximity-based services wireless network via a first time-frequency resource identified by a first logical time index and a first logical frequency index, a first occurrence of a first discovery signal for the user device during a first discovery period; determine a time index adjustment associated with the first logical frequency index; determine, by the user device, a second logical time index of a second time-frequency resource for transmitting from the user device a second occurrence of the first discovery signal within the first discovery period, the second logical time index being determined based on the first logical time index and the time index adjustment associated with the first logical frequency index; and transmit, by the user device via the second time-frequency resource, a second occurrence of the discovery signal during the first discovery period.

According to an example implementation, a computer program product may include a computer-readable storage medium and storing executable code that, when executed by at least one data processing apparatus, is configured to cause the at least one data processing apparatus to perform a method including: transmitting, by a user device in a proximity-based services wireless network via a first time-frequency resource identified by a first logical time index and a first logical frequency index, a first occurrence of a first discovery signal for the user device during a first discovery period; determining a time index adjustment associated with the first logical frequency index; determining, by the user device, a second logical time index of a second time-frequency resource for transmitting from the user device a second occurrence of the first discovery signal within the first discovery period, the second logical time index being determined based on the first logical time index and the time index adjustment associated with the first logical frequency index; and transmitting, by the user device via the second time-frequency resource, a second occurrence of the discovery signal during the first discovery period.

According to an example implementation, an apparatus may include means (904 and/or 902A/902B, FIG. 9) for transmitting, by a user device in a proximity-based services wireless network via a first time-frequency resource identified by a first logical time index and a first logical frequency index, a first occurrence of a first discovery signal for the user device during a first discovery period; means (904 and/or 902A/902B) for determining a time index adjustment associated with the first logical frequency index; means (904 and/or 902A/902B) for determining, by the user device, a second logical time index of a second time-frequency resource for transmitting from the user device a second occurrence of the first discovery signal within the first discovery period, the second logical time index being determined based on the first logical time index and the time index adjustment associated with the first logical frequency index; and means (904 and/or 902A/902B) for transmitting, by the user device via the second time-frequency resource, a second occurrence of the discovery signal during the first discovery period.

Figure 8:
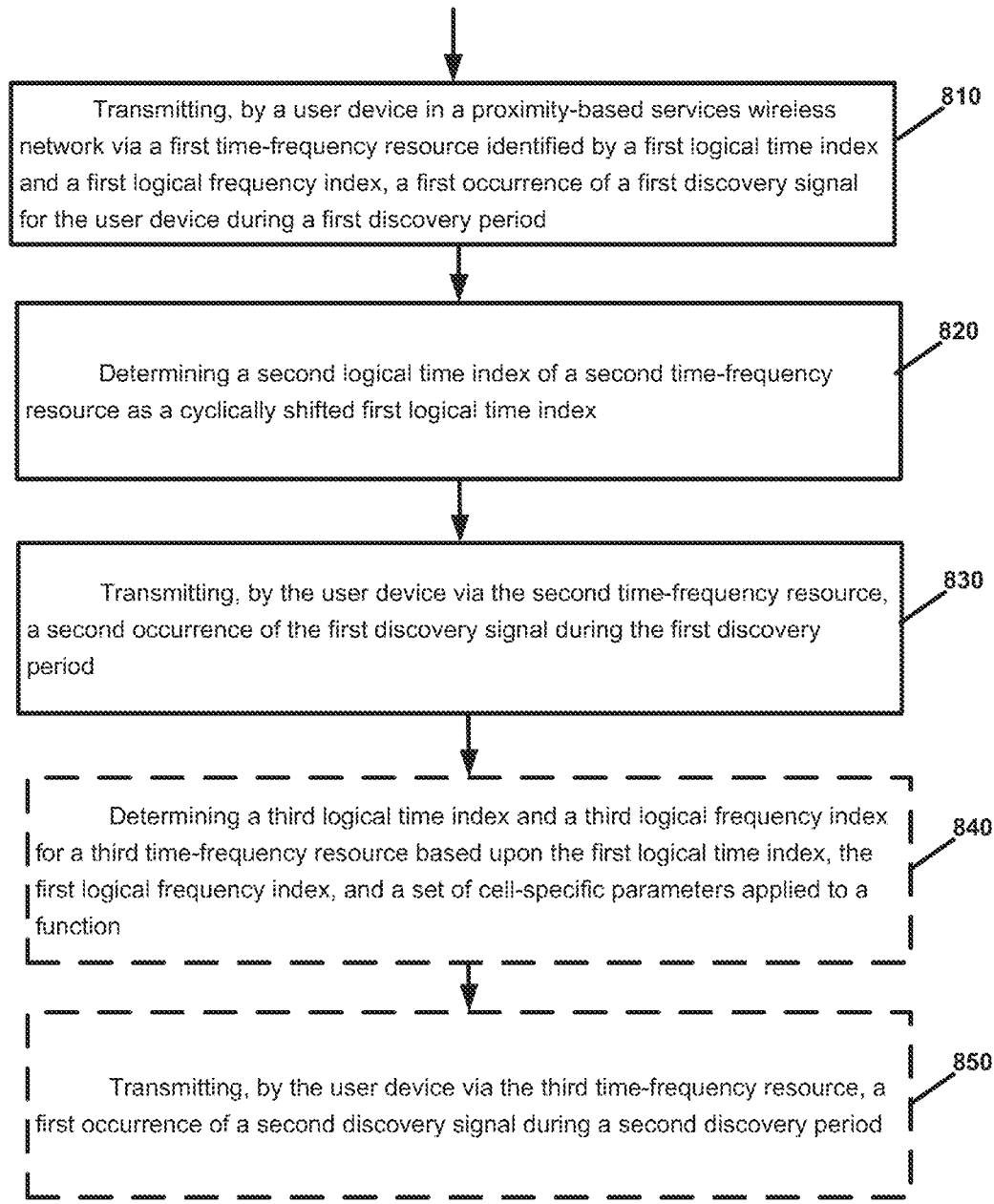
FIG. 8 is a flow chart illustrating operation of a user device according to another example implementation.

FIG. 8 is a flow chart illustrating operation of a user device according to yet another example implementation. Operation 810 may include transmitting, by a user device in a proximity-based services wireless network via a first time-frequency resource identified by a first logical time index and a first logical frequency index, a first occurrence of a first discovery signal for the user device during a first discovery period. Operation 820 may include determining a second logical time index of a second time-frequency resource as a cyclically shifted first logical time index. Operation 830 may include transmitting, by the user device via the second time-frequency resource, a second occurrence of the first discovery signal during the first discovery period.

According to another example implementation, the method of FIG. 8 may further include several operations, including: Operation 840 my include determining a third logical time index and a third logical frequency index for a third time-frequency resource based upon the first logical time index, the first logical frequency index, and a set of cell-specific parameters applied to a function. Operation 850 may include transmitting, by the user device via the third time-frequency resource, a first occurrence of a second discovery signal during a second discovery period.

An apparatus may include at least one processor and at least one memory including computer instructions, when executed by the at least one processor, cause the apparatus to: transmit, by a user device in a proximity-based services wireless network via a first time-frequency resource identified by a first logical time index and a first logical frequency index, a first occurrence of a first discovery signal for the user device during a first discovery period; determine a second logical time index of a second time-frequency resource as a cyclically shifted first logical time index; and transmit, by the user device via the second time-frequency resource, a second occurrence of the first discovery signal during the first discovery period.

According to another example implementation, a computer program product may include a computer-readable storage medium and storing executable code that, when executed by at least one data processing apparatus, is configured to cause the at least one data processing apparatus to perform a method including: transmitting, by a user device in a proximity-based services wireless network via a first time-frequency resource identified by a first logical time index and a first logical frequency index, a first occurrence of a first discovery signal for the user device during a first discovery period; determining a second logical time index of a second time-frequency resource as a cyclically shifted first logical time index; and transmitting, by the user device via the second time-frequency resource, a second occurrence of the first discovery signal during the first discovery period.

According to another example implementation, an apparatus may include means (904 and/or 902A/902B) for transmitting, by a user device in a proximity-based services wireless network via a first time-frequency resource identified by a first logical time index and a first logical frequency index, a first occurrence of a first discovery signal for the user device during a first discovery period; means (904 and/or 902A/902B) for determining a second logical time index of a second time-frequency resource as a cyclically shifted first logical time index; and means (904 and/or 902A/902B) for transmitting, by the user device via the second time-frequency resource, a second occurrence of the first discovery signal during the first discovery period.

Figure 9:
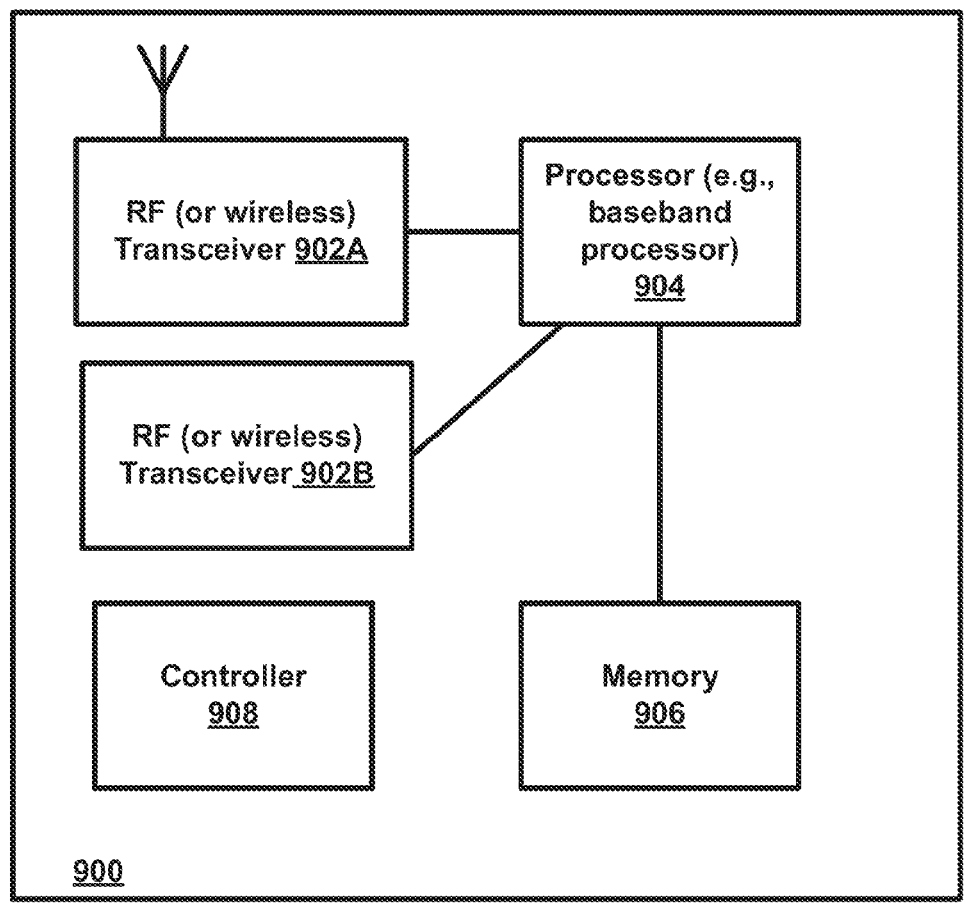
FIG. 9 is a block diagram of a wireless device (e.g., user device, BS or other wireless device) according to an example implementation.

FIG. 9 is a block diagram of a wireless station (e.g., BS or user device) 900 according to an example implementation. The wireless station 900 may include, for example, two RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902. Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 may control the RF or wireless transceiver 902A or 902B to receive, send or transmit signals or data.

According to an example implementation, an apparatus may include means for sending and/or receiving signals (e.g., processor 904 controlling RF or wireless transceiver 902A/902B).

Above, the combinatorial design of transmission patterns was introduced for signals, such as for discovery signal transmissions, in order to avoid half duplex problem that a transmitting user device cannot simultaneously receive. The half duplex considerations apply also to the mutual hearability of scheduling assignments (SAs) and the combinatorial design can be used for solving the half duplex problem in case of scheduling assignments, too. Scheduling assignments (SAs) were introduced for ProSe communication according to LTE Rel-12 specification: before transmitting the actual ProSe communication message, the user device indicates through a scheduling assignment(s) information such as transport block size and time and frequency resource, needed by other user devices for reception of the communication message. In an example implementation, user devices may transmit two identical scheduling assignment messages in a scheduling period and that a scheduling assignment resource pool for carrying one of the two scheduling assignment transmissions may occupy one subframe in time and one physical resource block in frequency. Therefore, a number of techniques of the illustrative examples described with respect to FIGS. 2 and 4 may be applied to scheduling assignments (SAs).

With reference to FIG. 4, according to an example implementation, first transmissions of discovery signals (or first transmissions of a scheduling assignment) from user devices are denoted by a M×N matrix P. Each index (or number) in the matrix P represents a time-frequency resource used to transmit a first discovery signal. Each row represents resources having a common frequency index. Each column of P represents resources having a common time index.

The second transmissions by user devices to transmit a second occurrence of a signal, e.g., a second occurrence of a scheduling assignment. According to an illustrative example, matrix P' may be obtained by applying a different time index adjustment for each row. In one illustrative example, the time index adjustment may include determining a different cyclical shift amount for each row (or each logical frequency index), and then cyclically shifting each row (or resources having a same logical frequency index) by the cyclical shift amount. For example, a top or first row of matrix P (resources having a first frequency index) may be shifted once (in time) to the right, the second row (resources having a second frequency index) may be shifted twice to the left, the third row (resources having a third frequency index) may be shifted three times to the left, and the fourth row (resources having a fourth frequency index) may be shifted four times (in time) to the left.

row 1 of P' is obtained through cyclically shifting of row 1 of P once:

row 2 of P is obtained through cyclically shifting of row 2 of P twice:

row 3 of P is obtained through cyclically shifting of row 3 of P 3 times:

...

row M of P' is obtained through cyclically shifting of row M of P M times, according to an illustrative example implementation.

$$P'' = \begin{bmatrix} 2 & 3 & 4 & \ldots & N-1 & N & 1 \\ N+3 & N+4 & N+5 & \ldots & 2N & N+1 & N+2 \\ \vdots & \vdots & \vdots & \vdots & \vdots & \vdots & \vdots \\ (M-1)N+1+M & (M-1)N+2+M & (M-1)N+3+M & \ldots & (M-1)N-2+M & (M-1)N-1+M & (M-1)N+M \end{bmatrix}_{M \times N}$$

By shifting the second (or subsequent) transmissions of a scheduling assignment or of a discovery signal, this may improve a half-duplex problem where a user device transmitting the signal (e.g., scheduling assignment or discovery signal) at the same time as another user device will be unable to hear or detect the transmitted discovery signals of the other user device. Thus, by determining a second discovery resource by applying at least a time index adjustment (e.g., based on a frequency index) to the first discovery resource, this makes it less likely that half-duplex user devices will be transmitting both discovery signals at the same time.

Figure 10:
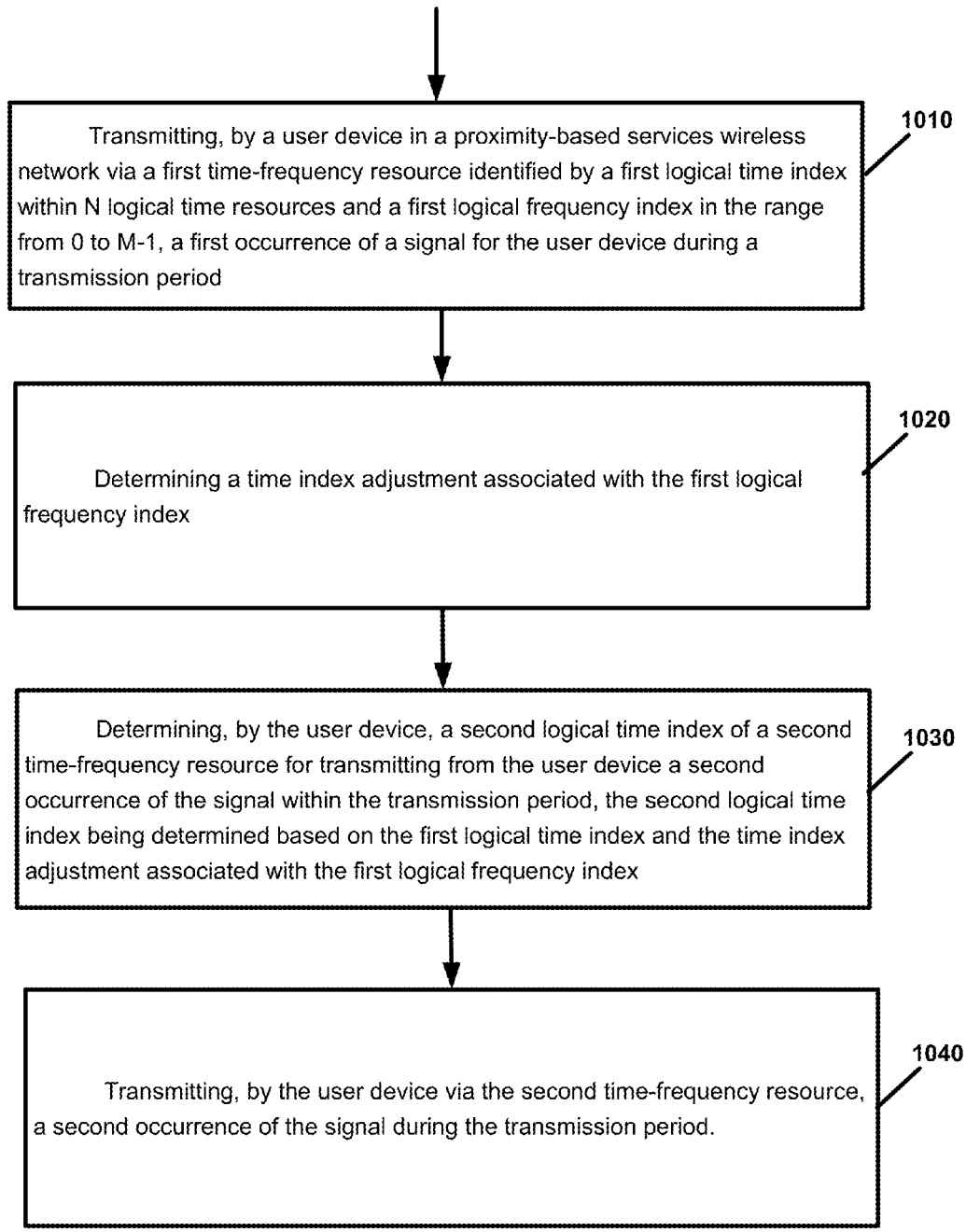
FIG. 10 is a flow chart illustrating operation of a user device according to an example implementation.

FIG. 10 is a flow chart illustrating operation of a user device according to an example implementation. Operation 310 includes transmitting, by a user device in a proximity-based services wireless network via a first time-frequency resource identified by a first logical time index within N logical time resources and a first logical frequency index in the range from 0 to M−1, a first occurrence of a signal for the user device during a transmission period. Operation 320 includes determining a time index adjustment associated with the first logical frequency index. Operation 330 includes determining, by the user device, a second logical $$P = \begin{bmatrix} 1 & 2 & 3 & \ldots & N-2 & N-1 & N \\ N+1 & N+2 & N+3 & \ldots & 2N-2 & 2N-1 & 2N \\ \vdots & \vdots & \vdots & \vdots & \vdots & \vdots & \vdots \\ (M-1)N+1 & (M-1)N+2 & (M-1)N+3 & \ldots & MN-2 & MN-1 & MN \end{bmatrix}_{M \times N}$$

time index of a second time-frequency resource for transmitting from the user device a second occurrence of the signal within the transmission period, the second logical time index being determined based on the first logical time index and the time index adjustment associated with the first logical frequency index. And, operation 340 includes transmitting, by the user device via the second time-frequency resource, a second occurrence of the signal during the transmission period.

Figure 11:
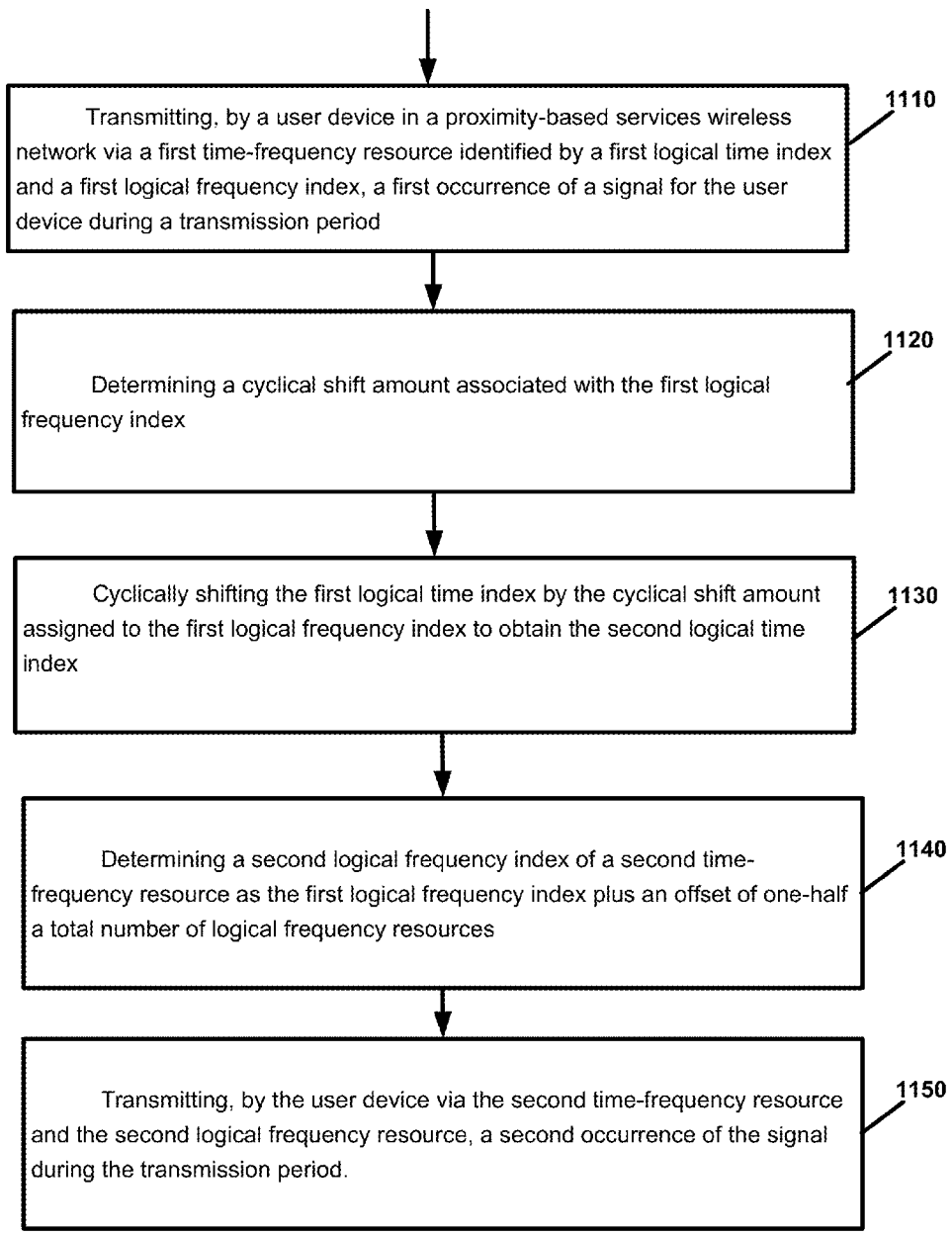
FIG. 11 is a flow chart illustrating operation of a user device according to another example implementation.

With reference to FIG. 4 and FIGS. 10-11, each index (or number) in the matrix P represents a time-frequency resource that may be used by a user device to transmit a first occurrence of a scheduling assignment (or alternatively to transmit a first occurrence of a discovery signal). Each row of matrix P represents resources having a common frequency index. Each column of matrix P represents resources having a common time index. Thus, for example, resource 1 (located in the first row and first column of matrix P) may have a first logical time index and a first logical frequency index, e.g., for transmitting a first occurrence of a scheduling assignment. Thus, there may be N logical time resources and M logical frequency resources in matrix P.

Matrix P' may have a similar structure and/or size as matrix P, but matrix P' may include resources that may be used to transmit a second occurrence of a signal, whereas resources of matrix P may be used to transmit a first occurrence of a signal. Each index (or number) in the matrix P' represents a time-frequency resource that may be used by a user device to transmit a second occurrence of a scheduling assignment (or alternatively to transmit a second occurrence of a discovery signal). Each row of matrix P' represents resources having a common frequency index. Each column of matrix P' represents resources having a common time index. Thus, for example, resource 1 (located in the first row and second column of matrix P') may have a first logical frequency index and a second logical time index, e.g., for transmitting a second occurrence of a scheduling assignment (or for transmitting a second occurrence of a discovery signal). Thus, there may be N logical time resources and M logical frequency resources in matrix P'. As a result, there may be 2M logical frequency resources in both matrices P and P' (together).

Referring to FIG. 4 and FIGS. 10 and 11, a user device may determine a time index adjustment associated with the first logical frequency index. In an example shown in FIG. 4, a resource 1 in matrix P is shown in the first column (e.g., corresponding to a first logical time index), and the first row (e.g., corresponding to a first logical frequency index) of matrix P, although in some cases, the "first" logical frequency index and "first" logical time index may be located anywhere within matrix P (resource 1 is merely an illustrative example for these). A time index adjustment may be determined for resource 1 as the time index adjustment for row 1 of matrix P (since resource 1 is within row 1 of Matrix P). For example, a time index adjustment may be determined as a cyclical shift amount assigned to the first logical frequency index (e.g., assigned to row 1 of matrix P). In the matrix P of FIG. 4, according to an illustrative example, the time index adjustment may include determining a different cyclical shift amount for each row (or each logical frequency index), and then cyclically shifting the resources within each row (or resources having a same logical frequency index) by the cyclical shift amount. For example, a top or first row of matrix P (resources having a first frequency index) may be shifted once (in time) to the right, the second row (resources having a second frequency index) may be shifted twice to the fright, the third row (resources having a third frequency index) may be shifted three times to the right, and the fourth row (resources having a fourth frequency index) may be shifted four times (in time) to the right. Thus, in the example of referring to resource 1 in matrix P of FIG. 4, the time index adjustment associated with the first logical frequency index (or first row, which is the location of resource 1) may be determined as a cyclical shift of 1.

In this illustrative example of resource 1 in FIG. 4, the second logical time index of a second time-frequency resource (e.g., for resource 1 in matrix P'), for transmitting a second occurrence of the scheduling assignment (or a second occurrence of a discovery signal) may be determined, for example, based on the first logical time index (e.g., first column, for the resource 1 in matrix P, in this illustrative example) and the time index adjustment associated with the first logical frequency index. The time index adjustment (or cyclical shift amount, for example) may be, for example, a cyclical shift of one. Thus, in this example, as shown in FIG. 4, the second logical time index of a second occurrence of the signal may be determined by cyclically shifting the first logical time index by the time index adjustment.

According to an example implementation of the method of FIG. 10, the time index adjustment associated with the first logical frequency index may include, for example, a cyclical shift amount assigned to the first logical frequency index, and wherein the determining, by the user device, of the second logical time index of the second time-frequency resource may include cyclically shifting the first logical time index by the amount assigned to the first logical frequency index to obtain the second logical time index. Thus, in this manner, resource 1 (FIG. 4) is provided at a first logical time index (first column of P) and a first logical frequency index (first row of P). Because, in this example for resource 1 in FIG. 4, the cyclical shift amount associated with the first row/first logical frequency index of P is 1 shift, the second logical time index (e.g., for resource 1, in matrix P1) may be obtained by cyclically shifting the first logical frequency index by 1 shift, e.g., causing the resource 1 in matrix P (which may be used to transmit first occurrence of the signal) to be shifted from the first column in matrix P to the second column in matrix P', to determine the second occurrence of the signal in matrix P'. This second column is the second logical time index for the second occurrence of the scheduling assignment (or discovery signal), e.g., resource 1 has been cyclically shifted by 1 column (or by 1 logical time index) to the right (the cyclical shift amount) as compared to the location of resource 1 in matrix P, in FIG. 4.

Also, with reference to the flow chart of FIG. 11, a second logical frequency index of a second time-frequency resource (e.g., resource 1, within matrix P') may be determined as the first logical frequency index plus an offset of one-half (½) a total number of logical frequency resources. In the example shown in FIG. 4, there are four rows/logical frequency resources for matrix P, and four rows/logical frequency resources for matrix P'. Thus, among matrices P and P' there are a total number of eight logical frequency resources. In this example, the logical frequency index of resource 1 within P' may be offset by four rows as compared to the logical frequency index or row of resource 1 within matrix P. Thus, in one example, depending on how the indexing is done within the matrices P and P', the first occurrence may have a logical frequency index Nf=0, and may be a second logical frequency index=Nf=0 (if same indexing is used for P and P', but the second logical frequency index is offset by four rows or four indices) as compared to the first logical frequency index/first row (location of resource 1 of matrix P). Thus, in this example, the second logical frequency index (and/or the row of the second logical frequency index) may be offset by ½ of the total number of logical frequency indices, e.g., by ½ of the total number of rows for matrices P and P'. Thus, the second occurrence of resource 1 in P' is offset by four rows, or is four rows lower in the FIG. 4 (as an example) from the row/logical frequency index of the first occurrence of resource 1 in matrix P.

According to an example implementation of the method of FIG. 10, the cyclic shift amount assigned to the first logical frequency index is equal to the first logical frequency index and, at least in some cases, wherein M<N, and the frequency indexes count starting from one. In another example implementation, the cyclic shift amount assigned to the first logical frequency index is equal to the first logical frequency index plus one, and at least in some cases, wherein M<N, and the frequency indexes count starting from zero.

According to an example implementation of the method of FIG. 10, the first logical frequency index that indexes to a first set of M logical frequency resources is equal to the second logical frequency index that indexes to a second set of M logical frequency resources.

According to an example implementation of the method of FIG. 10, the signal may include, for example, either a scheduling assignment, or a discovery signal.

According to an example implementation of the method of FIG. 10, a first set of M logical frequency resources are available for a transmission of the first occurrence of the signal, and a second set of M logical frequency resources are available for a transmission of the second occurrence of the signal, to provide a total of 2M available frequency resources, wherein the second logical frequency index is offset by M frequency resources from the first logical frequency index.

According to an example implementation, an apparatus may include at least one processor and at least one memory including computer instructions, when executed by the at least one processor, cause the apparatus to: transmit, by a user device in a proximity-based services wireless network via a first time-frequency resource identified by a first logical time index within N logical time resources and a first logical frequency index in the range from 0 to M−1, a first occurrence of a signal for the user device during a transmission period; determine a time index adjustment associated with the first logical frequency index; determine, by the user device, a second logical time index of a second time-frequency resource for transmitting from the user device a second occurrence of the signal within the transmission period, the second logical time index being determined based on the first logical time index and the time index adjustment associated with the first logical frequency index; and transmit, by the user device via the second time-frequency resource, a second occurrence of the signal during the transmission period.

According to an example implementation of the apparatus, the time index adjustment associated with the first logical frequency index may include a cyclical shift amount assigned to the first logical frequency index; and wherein the apparatus being configured to determine, by the user device, of the second logical time index of the second time-frequency resource may include the apparatus being configured to: cyclically shift the first logical time index by the cyclical shift amount assigned to the first logical frequency index to obtain the second logical time index.

According to an example implementation of the apparatus, the cyclic shift amount assigned to the first logical frequency index is equal to the first logical frequency index and wherein, at least in some cases, M<N. For example, when M<N, this means that the second logical time index will not be equal to the first logical time index, for example.

According to an example implementation of the apparatus, the cyclic shift amount assigned to the first logical frequency index is equal to the first logical frequency index plus one, and wherein, at least in some cases, M<N.

According to an example implementation of the apparatus, the signal may include, for example, either a scheduling assignment, or a discovery signal.

According to an example implementation of the apparatus, a first set of M logical frequency resources are available for a transmission of the first occurrence of the signal, and a second set of M logical frequency resources are available for a transmission of the second occurrence of the signal, to provide a total of 2M available frequency resources, wherein the second logical frequency index is offset by M frequency resources from the first logical frequency index.

FIG. 11 is a flow chart illustrating operation of a user device according to another example implementation. Operation 1110 includes transmitting, by a user device in a proximity-based services wireless network via a first time-frequency resource identified by a first logical time index and a first logical frequency index in the range from, a first occurrence of a signal for the user device during a transmission period. Operation 1120 includes determining a cyclical shift amount associated with the first logical frequency index. Operation 1130 includes cyclically shifting the first logical time index by the cyclical shift amount assigned to the first logical frequency index to obtain the second logical time index. Operation 1140 includes determining a second logical frequency index of a second time-frequency resource as the first logical frequency index plus an offset of one-half a total number of logical frequency resources. And, operation 1150 includes transmitting, by the user device via the second time-frequency resource and the second logical frequency resource, a second occurrence of the signal during the transmission period.

According to an example implementation of the method of FIG. 11, the transmitting may include transmitting, by a user device in a proximity-based services wireless network via a first time-frequency resource identified by a first logical time index within N logical time resources and a first logical frequency index in the range from 0 to M−1, a first occurrence of a signal for the user device during a transmission period, wherein the total number of logical frequency resources is 2M.

According to an example implementation of the method of FIG. 11, the signal may include, for example, either a scheduling assignment or a discovery signal.

According to an example implementation of the method of FIG. 11, a first set of M logical frequency resources are available for a transmission of the first occurrence of the signal, and a second set of M logical frequency resources are available for a transmission of the second occurrence of the signal, to provide a total of 2M available frequency resources, wherein the second logical frequency index is offset by M frequency resources from the first logical frequency index.

According to an example implementation, an apparatus may include at least one processor and at least one memory including computer instructions, when executed by the at least one processor, cause the apparatus to: transmit, by a user device in a proximity-based services wireless network via a first time-frequency resource identified by a first logical time index and a first logical frequency index, a first occurrence of a signal for the user device during a transmission period; determine a cyclical shift amount associated with the first logical frequency index; cyclically shift the first logical frequency index by the cyclical shift amount assigned to cyclically shift the first logical time index to obtain the second logical time index; determine a second logical frequency index of a second time-frequency resource as the first logical frequency index plus an offset of one-half a total number of logical frequency resources; and transmit, by the user device via the second time-frequency resource and the second logical frequency resource, a second occurrence of the signal during the transmission period.

According to an example implementation of the apparatus, the signal may, for example, include a scheduling assignment or a discovery signal.

Further example implementations will now be described.

Using some illustrative numbers by way of example may describe one or more features of the SA (scheduling assignment) transmission patterns according to various example implementations. Thus, in an illustrative example, with total N=8 subframes (e.g., logical time indices) available for SA transmission, and k=2 (k is the number of SA transmissions per SA message), at most we can accommodate Comb(N=8, k=2)=28 user devices with mutually hearable patterns. If N=12, then from Comb(N=12, k=2)=66, we can choose up to 64 transmission patterns with mutual hearability out of them.

Figure 12:
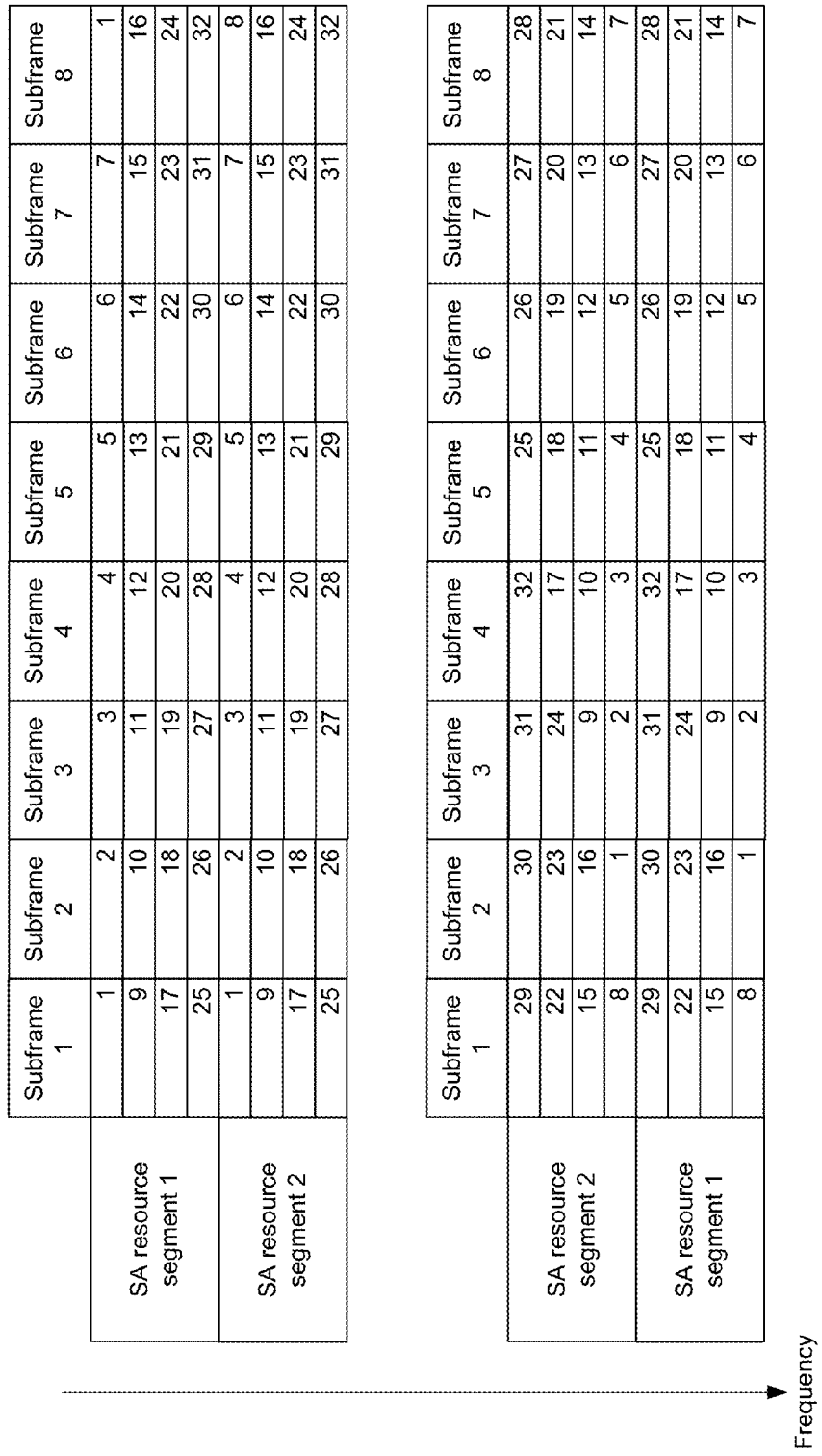
FIG. 12 is a diagram illustrating time-frequency resources that may be used to transmit scheduling assignments according to an example implementation.
Figure 14:
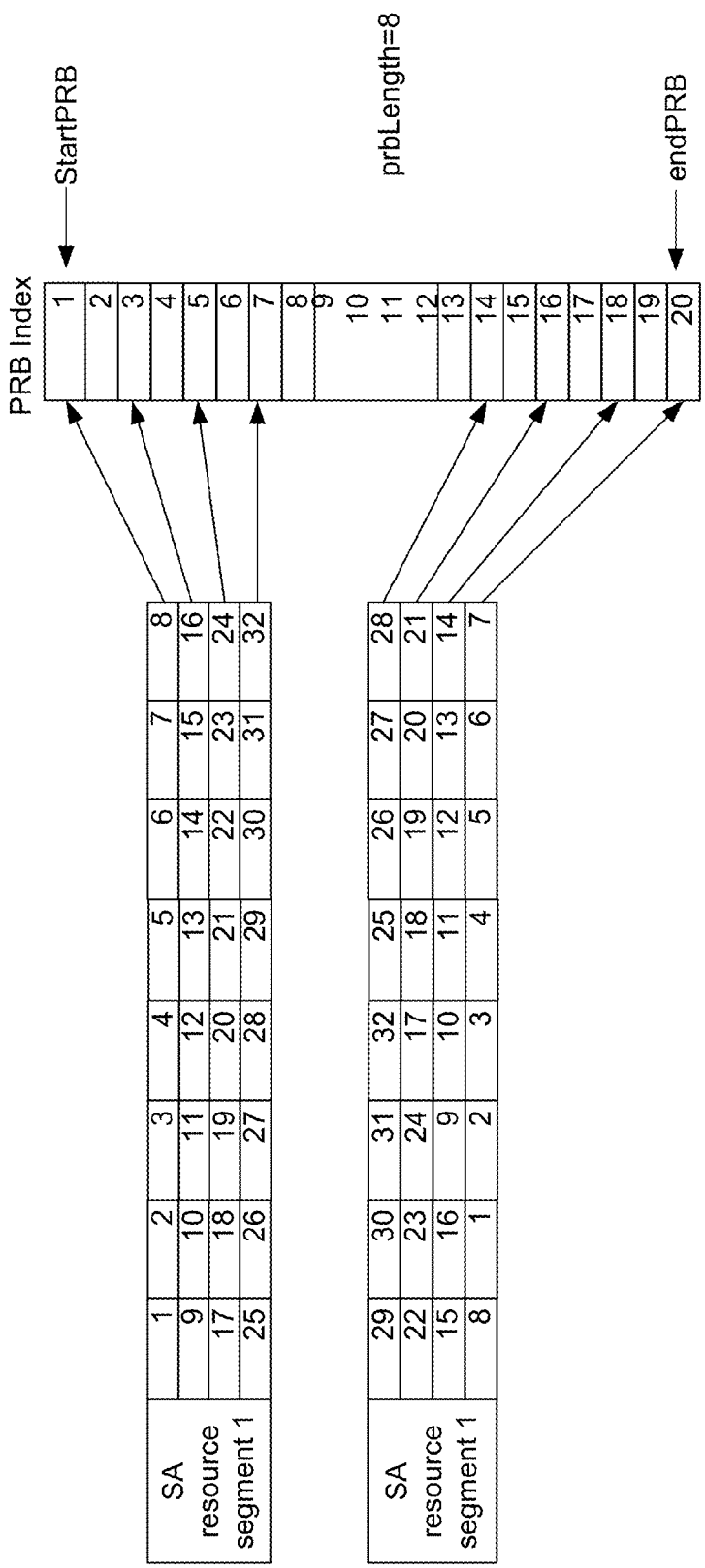
FIG. 14 illustrates a mapping of transmit patterns (SA resources/resource indexes) to physical resources (PRBs) according to an example implementation.

FIG. 12 is a diagram illustrating time-frequency resources that may be used to transmit scheduling assignments according to an example implementation. The different frequency resources are shown vertically, and different times (or time resources)/subframes are show horizontally. In the example of resources shown in FIG. 12, N=8, and there are 32 patterns (a pattern determines in which time-frequency resources a UE transmits; it listens during the rest of the time resources) on one SA resource segment. In the figure, it is illustrated that two SA resource segments can be configured. In total, 64 patterns (or arrangements of resources for a UE to transmit in) can be selected by 6 bits. It can be seen that the 2 transmissions associated with one SA resource index are placed close to the startPRB and to the endPRB respectively. The mapping of SA patterns in SA resource segment 1 into PRBs is shown in FIG. 14.

FIG. 13, a illustrates a resource design according to another example implementation in which N=12 and there are 64 patterns. The different frequency resources are shown vertically, and different times (or time resources)/subframes are shown horizontally. It can be seen the 2 transmissions associated with one SA resource index are placed close to the top (startPRB) and to the bottom (endPRB) respectively, so the maximum frequency diversity is achieved, at least in this example.

In mode 1 i.e., with eNB/BS-controlled resource allocation, when the D2D traffic load is low, the eNB/BS can use a SA resource with lower indices so the PRBs located away from startPRB and endPRB are not occupied or fragmented by SAs, and they can be used for cellular uplink data transmission, according to an example implementation.

In general, SA (scheduling assignment) may play two roles in the D2D communications: one role is similar to that of PDCCH (physical downlink control channel), which provides the resource assignment information and other information to receive UEs; another role is similar to that of PRACH. As there is no central node to coordinate the D2D data transmissions in mode 2 i.e., the mode where UEs/user devices select the resource (to be used to transmit scheduling assignments) autonomously, UEs/user devices need to contend for SA resource, and when the number of SA transmission patterns is large, the collision probability becomes small. Of course, the collision probability for transmitting SAs is also affected by the number of transmit UEs/user devices. And for different numbers of transmit UEs/user devices, to maintain the same level of collision probability, the required number of transmission patterns can be different. According to an example implementation, there may be parity between the capacity for D2D data and SA (scheduling assignments), otherwise one of them may become the bottleneck of D2D communications. Several scenarios can be considered below:

1) According to an illustrative example implementation, when the system bandwidth is small, e.g., 1.4 MHz, there are at most 6 PRBs in total for SA even if no PRBs are reserved for PUCCH (physical uplink control channel), and that will not be enough to map all 64 transmission patterns into. Of course, in this case, one can ask whether all 64 transmission patterns are needed considering the D2D traffic load over 1.4 MHz will not be very high.

2) In other cases, even if the system bandwidth is large, e.g. 20 MHz, there are enough PRBs to map all 64 transmission patterns into, the D2D traffic load may be low, hence not all 64 transmission patterns are needed.

FIG. 14 illustrates a mapping of transmit patterns (SA resource/resource index) to physical resources (PRBs) according to an example implementation. In the mapping of transmit patterns/SA resources to physical resources (such as shown in FIG. 14), from the discussion above, several parameters may be considered in performing such mapping, such as, for example, system bandwidth, the available PRBs for SAs, as well as D2D traffic. Furthermore, for example, at times it may be desirable to map SA transmission patterns into sparsely spaced PRBs so in-band emissions (IBE) can be mitigated at the expense of higher SA overhead. For example, with N=8, from FIG. 12, all 64 transmission patterns/resources can be mapped to 16 PRBs. However, if those 64 transmission patterns/resources are mapped to 32 PRBs or 48 PRBs, then some "guard" PRBs can be created between SA transmissions so the IBE issue will be less severe, according to an example implementation.

In FIG. 14, the mapping from SA pattern index to PRBs is shown. Note, in the example of FIG. 14, N=8 and only one SA resource segment is needed. As noted above, there can be different requirements on the number of SA patterns, and also the size of prbLength can be different. A mapping rule may be useful which can handle all resulting combinations. In the following, two example alternatives are described.

In Alternative 1, the mapping can take the form below for the part starting from startPRB:

PRB_index=startPRB+floor(prbLength/(single side SA parallel resource size(4 in FIG. 14))×parallel resource index)+shift_value for the part starting from endPRB:

PRB_index=endPRB−floor(prbLength/(single side SA parallel resource size (4 in FIG. 14))×parallel resource index)−shift_value. In the example above, prbLength=8, single side SA parallel resource size=4, parallel resource index=0,1,2,3, shift_value=0.

Shift_value can be used to offset the PRBs used SAs in adjacent cells so some frequency reuse pattern can be exploited to mitigate interference. For example, in an adjacent cell, Shift_value=1 can be used.

Note the mapping is defined by three parameters: SA parallel resource size, prbLength, and Shift_value.

In Alternative 2, the mapping is defined by two parameters, Shift_value and the incremental step. For the part staring from startPRB:

PRB_index=startPRB+(parallel resource index−1)× (the incremental step)+Shift_value For the part starting from endPRB:

PRB_index=endPRB−(parallel resource index−1)× (the incremental step)−Shift_value According to an example implementation, if a SA resource index would lead PRB_index to go beyond startPRB+prbLength−1 or go below endPRB+prbLength+1, then that index is not typically eligible for use by any UE. In this way, the physical limitation due to small bandwidth (say 1.4 MHz) can be automatically taken care of, and a unified treatment can be used.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

Further more, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    transmitting, by a user device in a proximity-based services wireless network via a first time-frequency resource identified by a first logical time index within N logical time resources and a first logical frequency index in the range from 0 to M−1, a first occurrence of a signal for the user device during a transmission period;
    determining a time index adjustment associated with the first logical frequency index;

determining, by the user device, a second logical time index of a second time-frequency resource for transmitting from the user device a second occurrence of the signal within the transmission period, the second logical time index being determined based on the first logical time index and the time index adjustment associated with the first logical frequency index;

determining a cyclical shift amount associated with the first logical frequency index;

cyclically shifting the first logical time index by the cyclical shift amount assigned to the first logical frequency index to obtain the second logical time index; and transmitting, by the user device via the second time-frequency resource, a second occurrence of the signal during the transmission period, wherein the cyclic shift amount assigned to the first logical frequency index is equal to the first logical frequency index plus one, where M<N.

2. The method of claim 1 wherein the signal comprises a scheduling assignment.

3. The method of claim 1 wherein the signal comprises a discovery signal.

4. The method of claim 1, wherein a first set of M logical frequency resources are available for a transmission of the first occurrence of the signal, and a second set of M logical frequency resources are available for a transmission of the second occurrence of the signal, to provide a total of 2M available frequency resources, wherein the second logical frequency index is offset by M frequency resources from the first logical frequency index.

5. An apparatus comprising at least one processor and at least one memory including computer instructions, when executed by the at least one processor, cause the apparatus to:

transmit, by a user device in a proximity-based services wireless network via a first time-frequency resource identified by a first logical time index within N logical time resources and a first logical frequency index in the range from 0 to M−1, a first occurrence of a signal for the user device during a transmission period;

determine a time index adjustment associated with the first logical frequency index;

determine, by the user device, a second logical time index of a second time-frequency resource for transmitting from the user device a second occurrence of the signal within the transmission period, the second logical time index being determined based on the first logical time index and the time index adjustment associated with the first logical frequency index;

determine a cyclical shift amount associated with the first logical frequency index;

cyclically shift the first logical time index by the cyclical shift amount assigned to the first logical frequency index to obtain the second logical time index; and transmit, by the user device via the second time-frequency resource, a second occurrence of the signal during the transmission period, wherein the cyclic shift amount assigned to the first logical frequency index is equal to the first logical frequency index plus one, where M<N.

6. The apparatus of claim 5 wherein the signal comprises a scheduling assignment.

7. The apparatus of claim 5 wherein the signal comprises a discovery signal.

8. The apparatus of claim 5, wherein a first set of M logical frequency resources are available for a transmission of the first occurrence of the signal, and a second set of M logical frequency resources are available for a transmission of the second occurrence of the signal, to provide a total of 2M available frequency resources, wherein the second logical frequency index is offset by M frequency resources from the first logical frequency index.

9. A method comprising:

transmitting, by a user device in a proximity-based services wireless network via a first time-frequency resource identified by a first logical time index and a first logical frequency index in the range from, a first occurrence of a signal for the user device during a transmission period;

determining a cyclical shift amount associated with the first logical frequency index;

cyclically shifting the first logical frequency index by the cyclical shift amount assigned to the first logical frequency index to obtain the second logical time index; and determining a second logical frequency index of a second time-frequency resource as the first logical frequency index plus an offset of one-half a total number of logical frequency resources; and transmitting, by the user device via the second time-frequency resource and the second logical frequency resource, a second occurrence of the signal during the transmission period.

10. The method of claim 9 wherein the transmitting comprises:

transmitting, by a user device in a proximity-based services wireless network via a first time-frequency resource identified by a first logical time index within N logical time resources and a first logical frequency index in the range from 0 to M−1, a first occurrence of a signal for the user device during a transmission period, wherein the total number of logical frequency resources is 2M.

11. The method of claim 9 wherein the signal comprises a scheduling assignment.

12. The method of claim 9 wherein the signal comprises a discovery signal.

13. An apparatus comprising at least one processor and at least one memory including computer instructions, when executed by the at least one processor, cause the apparatus to:

transmit, by a user device in a proximity-based services wireless network via a first time-frequency resource identified by a first logical time index and a first logical frequency index in the range from, a first occurrence of a signal for the user device during a transmission period;

determine a cyclical shift amount associated with the first logical frequency index;

cyclically shifting the first logical time index by the cyclical shift amount assigned to the first logical frequency index to obtain the second logical time index; and determine a second logical frequency index of a second time-frequency resource as the first logical frequency index plus an offset of one-half a total number of logical frequency resources; and transmit, by the user device via the second time-frequency resource and the second logical frequency resource, a second occurrence of the signal during the transmission period.

14. The apparatus of claim 13 wherein the signal comprises a scheduling assignment.

15. The method of claim 13 wherein the signal comprises a discovery signal.

* * * * *

UNITED STATES PATENT AND TRADEMARK OFFICE
CERTIFICATE OF CORRECTION

PATENT NO. : 9,942,742 B2  
APPLICATION NO. : 14/864390  
DATED : April 10, 2018  
INVENTOR(S) : Yang et al.

Page 1 of 1

It is certified that error appears in the above-identified patent and that said Letters Patent is hereby corrected as shown below:

In the Claims

In Column 30, Line 16, Claim 9, delete "frequency" and insert -- time --, therefor.

In Column 31, Line 3, Claim 15, delete "method" and insert -- apparatus --, therefor.

Signed and Sealed this
Twenty-third Day of June, 2020

Andrei Iancu
*Director of the United States Patent and Trademark Office*